United States Patent
Yang et al.

(10) Patent No.: US 11,758,533 B2
(45) Date of Patent: *Sep. 12, 2023

(54) UPLINK CHANNEL MULTIPLEXING AND PIGGYBACKING

(71) Applicant: QUALCOMM Incorporated, San Diego, CA (US)

(72) Inventors: Wei Yang, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/646,664

(22) Filed: Dec. 30, 2021

(65) Prior Publication Data

US 2022/0240270 A1  Jul. 28, 2022

Related U.S. Application Data

(63) Continuation of application No. 16/552,810, filed on Aug. 27, 2019, now Pat. No. 11,234,252.

(Continued)

(51) Int. Cl.
 *H04W 72/12* (2009.01)
 *H04W 72/04* (2009.01)
(Continued)

(52) U.S. Cl.
 CPC ........ *H04W 72/121* (2013.01); *H04L 1/0026* (2013.01); *H04L 5/0051* (2013.01);
(Continued)

(58) Field of Classification Search
 CPC .......... H04W 72/121; H04W 72/042; H04L 1/0026; H04L 5/0051; H04L 5/0092; H04L 25/0226
(Continued)

(56) References Cited

U.S. PATENT DOCUMENTS

| 2016/0212649 A1 | 7/2016 | Chen et al. |
| 2018/0102887 A1 | 4/2018 | Chen et al. |

(Continued)

FOREIGN PATENT DOCUMENTS

| CN | 104685955 A | 6/2015 |
| CN | 107431586 A | 12/2017 |
| WO | WO-2017052251 A1 | 3/2017 |

OTHER PUBLICATIONS

International Search Report and Written Opinion—PCT/US2019/048549—ISA/EPO—dated Nov. 12, 2019 (184556WO).

(Continued)

*Primary Examiner* — Gbemileke J Onamuti
(74) *Attorney, Agent, or Firm* — Holland & Hart LLP

(57) ABSTRACT

Methods, systems, and devices for wireless communications are described. Generally, the described techniques provide for configuring group indices for uplink transmissions from a user equipment (UE) such that the UE may be able to determine whether to combine uplink transmissions scheduled on overlapping time resources. Specifically, the UE may combine uplink transmissions associated with a same group index for transmission in a single channel, and the UE may avoid combining uplink transmissions associated with different group indices. In some cases, the indication of a group index associated with an uplink transmission from a UE may be explicit (e.g., provided in a downlink control information (DCI) message), and, in other cases, the indication of a group index associated with an uplink transmission from a UE may be implicit (e.g., corresponding to a resource allocated for the uplink transmission).

52 Claims, 14 Drawing Sheets

Related U.S. Application Data

(60) Provisional application No. 62/723,908, filed on Aug. 28, 2018.

(51) Int. Cl.
    *H04L 1/00*         (2006.01)
    *H04L 25/02*       (2006.01)
    *H04L 5/00*         (2006.01)
    *H04W 72/121*     (2023.01)
    *H04W 72/23*      (2023.01)

(52) U.S. Cl.
    CPC ........ *H04L 5/0092* (2013.01); *H04L 25/0226* (2013.01); *H04W 72/23* (2023.01)

(58) Field of Classification Search
    USPC ....................................................... 370/329
    See application file for complete search history.

(56) References Cited

U.S. PATENT DOCUMENTS

2018/0278398 A1   9/2018  Ahn et al.
2019/0007175 A1   1/2019  Kwak et al.
2020/0077416 A1   3/2020  Yang et al.

OTHER PUBLICATIONS

International Preliminary Report on Patentability—PCT/US2019/048549, The International Bureau of WIPO—Geneva, Switzerland, dated Mar. 11, 2021 (184556WO).

Motorola Mobility et al: "Maintenance for UL Power Control", 3GPP Draft; R1-1809398-POWER-CONTROL-FINAL, 3rd Generation Partnership Project (3GPP), vol. RAN WG1, no. Gothenburg, Sweden; Aug. 20, 2018-Aug. 24, 2018, Aug. 12, 2018, XP051516762, 13 pages, Retrieved from the Internet: URL: http://www.3gpp.org/ftp/tsg%5Fran/WG1%5FRL1/TSGR1%5F94/Docs/R1%2D1809398%2Ezip [retrieved on Aug. 12, 2018] sections 3.1, 4, 4.1, 4.2.

Taiwan Search Report—TW108130793—TIPO—dated Oct. 28, 2022.

UPLINK CHANNEL MULTIPLEXING AND PIGGYBACKING

CROSS REFERENCE

The present Application for Patent is a Continuation of U.S. patent application Ser. No. 16/552,810 by YANG et al., entitled, "UPLINK CHANNEL MULTIPLEXING AND PIGGYBACKING" filed Aug. 27, 2019, which claims the benefit of U.S. Provisional Patent Application No. 62/723,908 by YANG et al., entitled, "UPLINK CHANNEL MULTIPLEXING AND PIGGYBACKING," filed Aug. 28, 2018, assigned to the assignee hereof, and expressly incorporated herein.

BACKGROUND

The following relates generally to wireless communications and more specifically to uplink channel multiplexing and piggybacking.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM).

A wireless multiple-access communications system may include a number of base stations or network access nodes, each simultaneously supporting communication for multiple communication devices, which may be otherwise known as user equipment (UE). Some wireless communications systems may support communications between a base station and a UE on multiple channels. In such systems, a UE may be scheduled to transmit uplink signals on different channels at the same time. That is, the base station may allocate overlapping time resources for uplink transmissions from the UE on the different channels. Conventional techniques at a UE for transmitting on the uplink when the UE is scheduled to transmit on different channels at the same time may be deficient.

SUMMARY

The described techniques relate to improved methods, systems, devices, and apparatuses that support uplink channel multiplexing and piggybacking. Generally, the described techniques provide for configuring group indices for uplink transmissions from a user equipment (UE) such that the UE may be able to determine whether to combine uplink transmissions scheduled on overlapping time resources. Specifically, the UE may combine uplink transmissions associated with a same group index for transmission in a single channel, and the UE may avoid combining uplink transmissions associated with different group indices. In some cases, the indication of a group index associated with an uplink transmission from a UE may be explicit (e.g., provided in a downlink control information (DCI) message), and, in other cases, the indication of a group index associated with an uplink transmission from a UE may be implicit (e.g., corresponding to a resource allocated for the uplink transmission).

A method for wireless communication at a UE is described. The method may include receiving a group configuration that indicates an association of uplink channels with group indices, where uplink channels having a same group index are to be combined with each other according to the group configuration and uplink channels having different group indices are not combined, identifying a set of uplink channels to be used for a corresponding set of uplink transmissions which overlap in time, determining individual group indices of the group configuration corresponding to each of the set of uplink channels, and transmitting at least a portion of the set of scheduled uplink transmissions on a single uplink channel based on the individual group indices of the group configuration.

An apparatus for wireless communication at a UE is described. The apparatus may include a processor, memory coupled with the processor, and instructions stored in the memory. The instructions may be executable by the processor to cause the apparatus to receive a group configuration that indicates an association of uplink channels with group indices, where uplink channels having a same group index are to be combined with each other according to the group configuration and uplink channels having different group indices are not combined, identify a set of uplink channels to be used for a corresponding set of uplink transmissions which overlap in time, determine individual group indices of the group configuration corresponding to each of the set of uplink channels, and transmit at least a portion of the set of uplink transmissions on a single uplink channel based on the individual group indices of the group configuration.

Another apparatus for wireless communication at a UE is described. The apparatus may include means for receiving a group configuration that indicates an association of uplink channels with group indices, where uplink channels having a same group index are to be combined with each other according to the group configuration and uplink channels having different group indices are not combined, identifying a set of uplink channels to be used for a corresponding set of uplink transmissions which overlap in time, determining individual group indices of the group configuration corresponding to each of the set of uplink channels, and transmitting at least a portion of the set of uplink transmissions on a single uplink channel based on the individual group indices of the group configuration.

A non-transitory computer-readable medium storing code for wireless communication at a UE is described. The code may include instructions executable by a processor to receive a group configuration that indicates an association of uplink channels with group indices, where uplink channels having a same group index are to be combined with each other according to the group configuration and uplink channels having different group indices are not combined, identify a set of uplink channels to be used for a corresponding set of uplink transmissions which overlap in time, determine individual group indices of the group configuration corresponding to each of the set of uplink channels, and transmit at least a portion of the set of uplink transmissions on a single uplink channel based on the individual group indices of the group configuration.

Some examples of the method, apparatuses, and non-transitory computer-readable medium described herein may further include operations, features, means, or instructions for identifying that one of the set of uplink transmissions may be a control information transmission on a control channel, identifying a control channel resource allocated for the control information transmission on the control channel and determining a group index corresponding to the control information transmission based on the control channel resource. In some examples of the method, apparatuses, and non-transitory computer-readable medium described herein, identifying the control channel resource may include operations, features, means, or instructions for receiving an indication of the control channel resource, where the control channel resource may be associated with the group index.

Some examples of the method, apparatuses, and non-transitory computer-readable medium described herein may further include operations, features, means, or instructions for identifying that one of the set of uplink transmissions may be a sounding reference signal (SRS) transmission on an SRS channel, identifying an SRS resource allocated for the SRS transmission on the SRS channel and determining a group index corresponding to the SRS transmission based on the SRS resource. In some examples of the method, apparatuses, and non-transitory computer-readable medium described herein, identifying the SRS resource may include operations, features, means, or instructions for receiving an indication of the SRS resource, where the SRS resource may be associated with the group index or the SRS resource may be within an SRS resource set associated with the group index.

Some examples of the method, apparatuses, and non-transitory computer-readable medium described herein may further include operations, features, means, or instructions for identifying that one of the set of uplink transmissions may be a channel state information (CSI) report transmission, determining whether the CSI report transmission may be associated with periodic, semi-persistent, or aperiodic CSI reporting and determining a group index corresponding to the CSI report transmission based on whether the CSI report transmission may be associated with periodic, semi-persistent, or aperiodic CSI reporting, where periodic, semi-persistent, and aperiodic CSI report transmissions may be associated with different group indices.

Some examples of the method, apparatuses, and non-transitory computer-readable medium described herein may further include operations, features, means, or instructions for identifying that one of the set of uplink transmissions may be a CSI report transmission on a control channel, identifying a control channel resource allocated for the CSI report transmission on the control channel and determining a group index corresponding to the CSI report transmission based on the control channel resource. Some examples of the method, apparatuses, and non-transitory computer-readable medium described herein may further include operations, features, means, or instructions for identifying that one of the set of uplink transmissions may be a CSI report transmission on a data channel, receiving a CSI report configuration for the CSI report transmission and determining a group index corresponding to the CSI report transmission based on an indication of the group index in the CSI report configuration.

Some examples of the method, apparatuses, and non-transitory computer-readable medium described herein may further include operations, features, means, or instructions for identifying that one of the set of uplink transmissions may be a scheduling request (SR) transmission, identifying an SR configuration for the SR transmission and determining a group index corresponding to the SR transmission based on the SR configuration, where the SR configuration may be associated with the group index.

Some examples of the method, apparatuses, and non-transitory computer-readable medium described herein may further include operations, features, means, or instructions for identifying that one of the set of uplink transmissions may be a data transmission on a data channel and determining a group index for the data transmission on the data channel based on a default group index corresponding to data transmissions on the data channel. In some examples of the method, apparatuses, and non-transitory computer-readable medium described herein, the default group index is a first default group index corresponding to data transmissions on the data channel on a first carrier or first bandwidth part (BWP), and the first default group index is different from a second default group index corresponding to data transmissions on the data channel on a second carrier or second BWP.

Some examples of the method, apparatuses, and non-transitory computer-readable medium described herein may further include operations, features, means, or instructions for identifying that one of the set of uplink transmissions may be a data transmission on a data channel, receiving DCI scheduling or activating the data transmission, identifying a SRS resource indicated by the DCI for an SRS transmission, the SRS resource associated with a group index for the SRS transmission and determining a group index for the data transmission based on the group index for the SRS transmission. Some examples of the method, apparatuses, and non-transitory computer-readable medium described herein may further include operations, features, means, or instructions for identifying that one of the set of uplink transmissions may be a data transmission on a data channel, receiving DCI scheduling or activating the data transmission, failing to identify a SRS resource configured by the DCI for an SRS transmission and determining a group index for the data transmission based on a default group index corresponding to data transmissions on the data channel.

Some examples of the method, apparatuses, and non-transitory computer-readable medium described herein may further include operations, features, means, or instructions for identifying that one of the set of uplink transmissions may be a data transmission on a data channel, receiving DCI scheduling or activating the data transmission and determining the group index for the data transmission based on an indication of the group index for the data transmission in the DCI. In some examples of the method, apparatuses, and non-transitory computer-readable medium described herein, the group index for the data transmission may be indicated in a dedicated field in the DCI. In some examples of the method, apparatuses, and non-transitory computer-readable medium described herein, the group index for the data transmission may be indicated by physical layer parameters configured for the data transmission in the DCI.

Some examples of the method, apparatuses, and non-transitory computer-readable medium described herein may further include operations, features, means, or instructions for identifying that one of the set of uplink transmissions may be a data transmission on a data channel, receiving higher layer signaling that schedules the data transmission and determining a group index for the data transmission based on an indication of the group index in the higher layer signaling. In some examples of the method, apparatuses, and non-transitory computer-readable medium described herein, the group configuration further indicates a total number of group indices configured for each of the set of channels.

Some examples of the method, apparatuses, and non-transitory computer-readable medium described herein may further include operations, features, means, or instructions for determining that two or more of the set of uplink transmissions may have a same group index, combining the two or more of the set of uplink transmissions to generate an uplink transmission based on the group indices of the two or more of the set of uplink transmissions being the same and transmitting the combined uplink transmission including of the two or more of the set of uplink transmissions on the single uplink channel.

In some examples of the method, apparatuses, and non-transitory computer-readable medium described herein, combining the two or more of the set of uplink transmissions may include operations, features, means, or instructions for multiplexing a first uplink transmission of the two or more of the set of uplink transmissions with a second uplink transmission of the two or more of the set of uplink transmissions in the single uplink channel or piggybacking a first uplink transmission of the two or more of the set of uplink transmissions on a second uplink transmission of the two or more of the set of uplink transmissions in the single uplink channel.

In some examples of the method, apparatuses, and non-transitory computer-readable medium described herein, piggybacking the first uplink transmission on the second uplink transmission includes determining a first coding rate for encoding the first uplink transmission based at least in part on a beta offset and a second coding rate for encoding the second uplink transmission, where the beta offset corresponds to the same group index of the first uplink transmission and the second uplink transmission; and encoding the first uplink transmission based on the first coding rate and the second uplink transmission based on the second coding rate.

In some examples of the method, apparatuses, and non-transitory computer-readable medium described herein, piggybacking the first uplink transmission on the second uplink transmission includes identifying a set of resources allocated for the second uplink transmission, identifying a first subset of the set of resources to use for the first uplink transmission and a second subset of the set of resources to use for the second uplink transmission based on a scaling factor, where the scaling factor indicates a maximum portion of the set of resources available for the first uplink transmission, and the scaling factor corresponds to the same group index of the first uplink transmission and the second uplink transmission; and mapping the first uplink transmission to the first subset of the set of resources and the second uplink transmission to the second subset of the set of resources.

Some examples of the method, apparatuses, and non-transitory computer-readable medium described herein may further include operations, features, means, or instructions for determining that a first uplink transmission and a second uplink transmission of the set of uplink transmissions may have a same group index, determining that the first uplink transmission includes a CSI report transmission and the second uplink transmission includes a hybrid automatic repeat request (HARQ) transmission or a scheduling request (SR) transmission and determining whether to combine the CSI report transmission with the HARQ or SR transmission based on the same group index.

In some examples of the method, apparatuses, and non-transitory computer-readable medium described herein, receiving the group configuration further may include operations, features, means, or instructions for receiving an indication of a priority associated with each of the individual group indices. Some examples of the method, apparatuses, and non-transitory computer-readable medium described herein may further include operations, features, means, or instructions for receiving an indication of a first priority associated with a first group index and a second priority associated with a second group index. Some examples of the method, apparatuses, and non-transitory computer-readable medium described herein may further include operations, features, means, or instructions for determining a first priority associated with a first group index based on the first group index and determining a second priority associated with a second group index based on the second group index.

Some examples of the method, apparatuses, and non-transitory computer-readable medium described herein may further include operations, features, means, or instructions for determining that a first group index corresponding to a first uplink transmission of the set of uplink transmissions may be different from a second group index corresponding to a second uplink transmission of the set of uplink transmissions, comparing a first priority associated with the first group index with a second priority associated with the second group index and determining whether to transmit the first uplink transmission or the second uplink transmission based on the comparison. Some examples of the method, apparatuses, and non-transitory computer-readable medium described herein may further include operations, features, means, or instructions for determining that a first group index corresponding to a first uplink transmission of the set of uplink transmissions may be different from a second group index corresponding to a second uplink transmission of the set of uplink transmissions and transmitting the first uplink transmission on a first channel and the second uplink transmission on a second channel.

A method for wireless communication at a base station is described. The method may include transmitting a group configuration that indicates an association of uplink channels with group indices, where uplink channels having a same group index are able to be combined with each other according to the group configuration and uplink channels having different group indices are not combined, identifying an uplink channel to be used for an uplink transmission from a UE, configuring a group index for the uplink transmission on the uplink channel, where the group index is to be used by the UE to determine whether to combine the uplink transmission with another uplink transmission scheduled on overlapping time resources, transmitting the configured group index for the uplink transmission, and monitoring for the uplink transmission from the UE based on the configured group index.

An apparatus for wireless communication at a base station is described. The apparatus may include a processor, memory coupled with the processor, and instructions stored in the memory. The instructions may be executable by the processor to cause the apparatus to transmit a group configuration that indicates an association of uplink channels with group indices, where uplink channels having a same group index are able to be combined with each other according to the group configuration and uplink channels having different group indices are not combined, identify an uplink channel to be used for an uplink transmission from a UE, configure a group index for the uplink transmission on the uplink channel, where the group index is to be used by the UE to determine whether to combine the uplink transmission with another uplink transmission scheduled on overlapping time resources, transmit the configured group index for the uplink transmission, and monitor for the uplink transmission from the UE based on the configured group index.

Another apparatus for wireless communication at a base station is described. The apparatus may include means for transmitting a group configuration that indicates an association of uplink channels with group indices, where uplink channels having a same group index are able to be combined with each other according to the group configuration and uplink channels having different group indices are not combined, identifying an uplink channel to be used for an uplink transmission from a UE, configuring a group index for the uplink transmission on the uplink channel, where the group index is to be used by the UE to determine whether to combine the uplink transmission with another uplink transmission scheduled on overlapping time resources, transmitting the configured group index for the uplink transmission, and monitoring for the uplink transmission from the UE based on the configured group index.

A non-transitory computer-readable medium storing code for wireless communication at a base station is described. The code may include instructions executable by a processor to transmit a group configuration that indicates an association of uplink channels with group indices, where uplink channels having a same group index are able to be combined with each other according to the group configuration and uplink channels having different group indices are not combined, identify an uplink channel to be used for an uplink transmission from a UE, configure a group index for the uplink transmission on the uplink channel, where the group index is to be used by the UE to determine whether to combine the uplink transmission with another uplink transmission scheduled on overlapping time resources, transmit the configured group index, and monitor for the uplink transmission from the UE based on the configured group index.

Some examples of the method, apparatuses, and non-transitory computer-readable medium described herein may further include operations, features, means, or instructions for identifying that the uplink transmission includes a control information transmission on a control channel and transmitting an indication of a control channel resource for the control information transmission on the control channel, where the group index for the control information transmission corresponds to a group index associated with the control channel resource.

Some examples of the method, apparatuses, and non-transitory computer-readable medium described herein may further include operations, features, means, or instructions for identifying that the uplink transmission includes a SRS transmission on an SRS channel and transmitting an indication of an SRS resource for the SRS transmission, where the group index for the SRS transmission corresponds to a group index associated with the SRS resource or associated with an SRS resource set that includes the SRS resource.

Some examples of the method, apparatuses, and non-transitory computer-readable medium described herein may further include operations, features, means, or instructions for identifying that the uplink transmission includes a CSI report transmission and transmitting an indication of whether the CSI report transmission may be associated with periodic, semi-persistent, or aperiodic CSI reporting, where periodic, semi-persistent, and aperiodic CSI report transmissions may be associated with different group indices.

Some examples of the method, apparatuses, and non-transitory computer-readable medium described herein may further include operations, features, means, or instructions for identifying that the uplink transmission includes a CSI report transmission on a control channel and transmitting an indication of a control channel resource for the CSI report transmission on the control channel, where the group index for the CSI report transmission corresponds to a group index associated with the control channel resource.

Some examples of the method, apparatuses, and non-transitory computer-readable medium described herein may further include operations, features, means, or instructions for identifying that the uplink transmission includes a CSI report transmission on a data channel and transmitting a CSI report configuration for the CSI report transmission, where the CSI report configuration includes an indication of the group index for the CSI report transmission on the data channel.

Some examples of the method, apparatuses, and non-transitory computer-readable medium described herein may further include operations, features, means, or instructions for identifying that the uplink transmission includes a SR transmission and transmitting an indication of an SR configuration for the SR transmission, where the group index for the SR transmission corresponds to a group index associated with the SR configuration.

Some examples of the method, apparatuses, and non-transitory computer-readable medium described herein may further include operations, features, means, or instructions for identifying that the uplink transmission includes a data transmission on a data channel and transmitting an indication of a default group index for data transmissions on the data channel, where the group index for the data transmission may be the default group index. In some examples of the method, apparatuses, and non-transitory computer-readable medium described herein, the default group index is a first default group index corresponding to data transmissions on the data channel on a first carrier or first BWP, and the first default group index is different from a second default group index corresponding to data transmissions on the data channel on a second carrier or second BWP.

Some examples of the method, apparatuses, and non-transitory computer-readable medium described herein may further include operations, features, means, or instructions for identifying that the uplink transmission includes a data transmission on a data channel and transmitting DCI to the UE for the data transmission, the DCI including an indication of a SRS resource allocated for SRS transmissions from the UE, where the SRS resource may be associated with a group index for the SRS transmission, and the group index for the data transmission corresponds to the group index for the SRS transmission.

Some examples of the method, apparatuses, and non-transitory computer-readable medium described herein may further include operations, features, means, or instructions for identifying that the uplink transmission includes a data transmission on a data channel and transmitting DCI to the UE for the data transmission, the DCI including an indication of the group index for the data transmission. In some examples of the method, apparatuses, and non-transitory computer-readable medium described herein, the group index for the data transmission may be indicated in a dedicated field in the DCI. In some examples of the method, apparatuses, and non-transitory computer-readable medium described herein, the group index for the data transmission may be indicated by physical layer parameters configured for the data transmission in the DCI.

Some examples of the method, apparatuses, and non-transitory computer-readable medium described herein may further include operations, features, means, or instructions for identifying that the uplink transmission includes a data transmission on a data channel and transmitting higher layer signaling that schedules the data transmission, where the higher layer signaling includes an indication of the group index for the data transmission. Some examples of the method, apparatuses, and non-transitory computer-readable medium described herein may further include operations, features, means, or instructions for transmitting an indication of a priority associated with the group index corresponding to the uplink transmission on the uplink channel.

DETAILED DESCRIPTION

Figure 1:
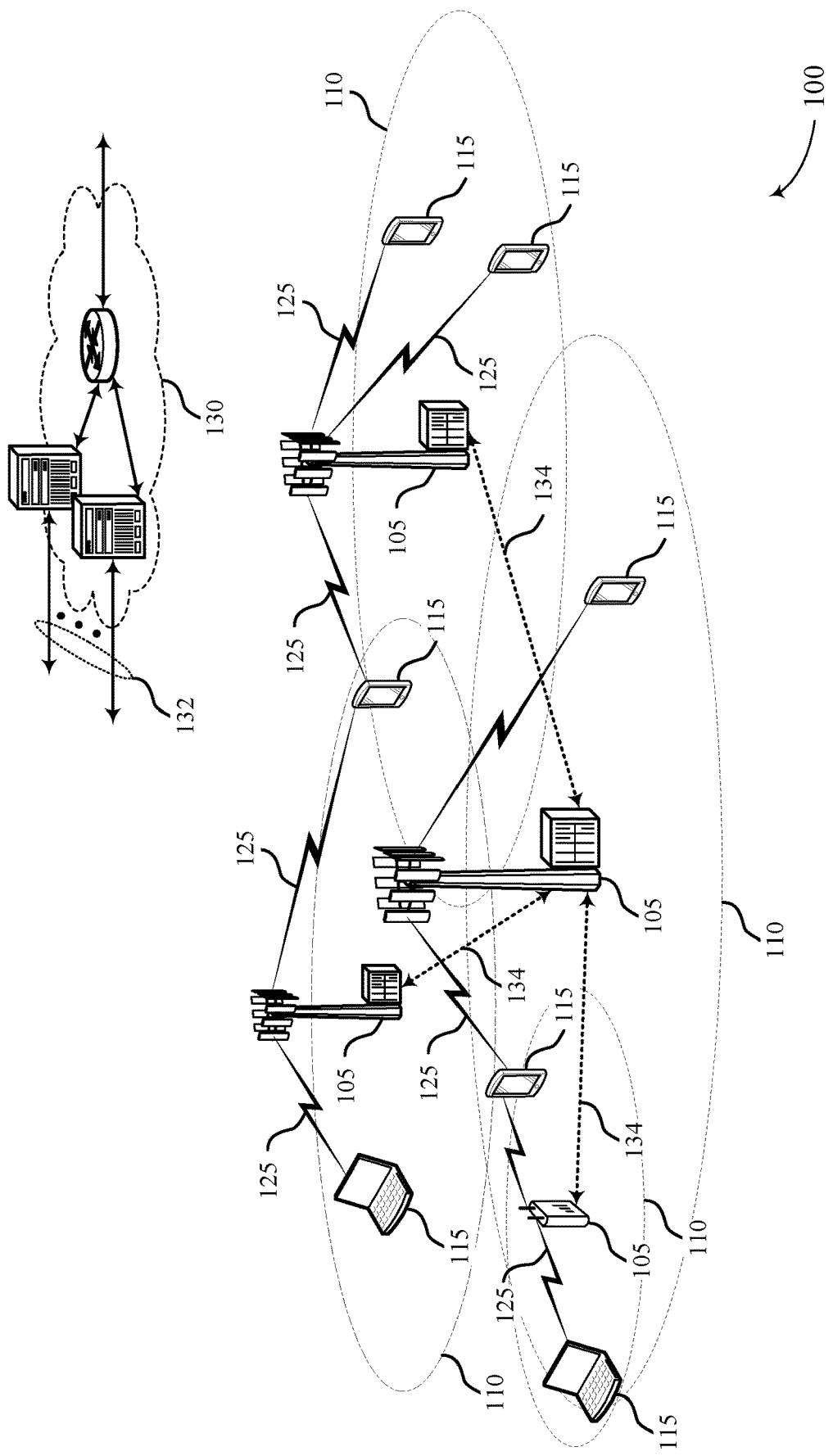
FIGS. 1 and 2 illustrate examples of wireless communications systems that support uplink channel multiplexing and piggybacking in accordance with aspects of the present disclosure.

Some wireless communications systems may support uplink communications between a base station and a user equipment (UE) on multiple channels (e.g., physical uplink shared channel (PUSCH), physical uplink control channel (PUCCH), sounding reference signal (SRS) channel, physical random access channel (PRACH), etc.). Uplink transmissions on these channels may be time-division multiplexed to prevent interference between the uplink transmissions (e.g., on a single component carrier). In some cases, however, a base station may schedule uplink transmissions from a UE on different channels at the same time. In such cases, the UE may be configured to combine the uplink transmissions prior to transmitting the uplink transmissions to a base station.

In one example, the base station may schedule a first PUCCH transmission and a second PUCCH transmission from the UE at the same time. In this example, the UE may multiplex the first PUCCH transmission and the second PUCCH transmission. That is, the UE may combine the payloads of the first and second PUCCH transmissions and perform joint encoding prior to transmitting the combined transmission to a base station. In another example, the base station may schedule a PUCCH transmission and a PUSCH transmission from the UE at the same time. In this example, the UE may piggyback the PUCCH transmission on the PUSCH transmission. That is, the UE may encode the payloads of the PUCCH transmission and the PUSCH transmission separately and combine the encoded payloads prior to transmitting the combined transmission to a base station.

Using the above techniques, a UE may combine uplink transmissions when the UE is scheduled for multiple uplink transmissions on different channels at the same time. In some aspects, however, uplink transmissions associated with different applications or intended for different base stations may be scheduled at the same time, and it may not be appropriate for a UE to combine the uplink transmissions. For instance, if a UE is scheduled for a mobile broadband (MBB) uplink transmission and an ultra-reliable low latency communications (URLLC) uplink transmission at the same time, it may not be appropriate for the UE to combine these transmissions (e.g., since combining these transmissions on a URLLC channel may overburden the URLLC channel). Further, if a UE is scheduled for an uplink transmission to one base station and another uplink transmission to another base station (i.e., a multi-TRP transmission) at the same time, it may not be appropriate for the UE to combine these transmissions when there is non-ideal backhaul between the base stations (e.g., since the uplink transmission for one base station may not be useful to the other base station).

As described herein, a wireless communications system may support efficient techniques for configuring a UE to determine whether to combine uplink transmissions scheduled on overlapping time resources. In particular, a base station may configure group indices for uplink transmissions from a UE, and the UE may be configured to determine whether to combine uplink transmissions based on the group indices of the uplink transmissions. If a UE determines that the group index corresponding to one uplink transmission is the same as the group index corresponding to another uplink transmission, the UE may combine the uplink transmissions. Alternatively, if the UE determines that the group index corresponding to one uplink transmission is different from the group index corresponding to another uplink transmission, the UE may not combine the uplink transmissions. In this case, the UE may drop one of the uplink transmissions (e.g., if the UE is not capable of transmitting multiple uplink transmissions on different channels simultaneously).

Aspects of the disclosure introduced above are described below in the context of a wireless communications system. Examples of processes and signaling exchanges that support uplink channel multiplexing and piggybacking are then described. Aspects of the disclosure are further illustrated by and described with reference to apparatus diagrams, system diagrams, and flowcharts that relate to uplink channel multiplexing and piggybacking.

FIG. 1 illustrates an example of a wireless communications system 100 that supports uplink channel multiplexing and piggybacking in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support mobile broadband (MBB) communications, enhanced MBB (eMBB) communications, ultra-reliable (e.g., mission critical) communications, low latency communications, ultra-reliable low latency communications (URLLC), or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105 or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), eMBB, or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an frequency division duplex (FDD) mode), or be configured to carry downlink and uplink communications (e.g., in a time division duplex (TDD) mode). In some examples, signal waveforms transmitted over a carrier may be made up of multiple sub-carriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data.

A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

Wireless communications system 100 may support communications between a base station 105 and a UE 115 on multiple channels (e.g., PUSCH, PUCCH, SRS channel, PRACH, etc.). Uplink transmissions on these channels may be time-division multiplexed to prevent interference between the uplink transmissions (e.g., on a single component carrier). In some cases, however, a base station 105 may schedule uplink transmissions on different channels from a UE 115 at the same time. In such cases, the UE may be configured to combine the uplink transmissions prior to transmitting the uplink transmissions to a base station 105.

In one example, the base station 105 may schedule a first PUCCH transmission and a second PUCCH transmission from the UE 115 at the same time. In this example, the UE 115 may multiplex the first PUCCH transmission and the second PUCCH transmission. That is, the UE 115 may combine the payloads of the first and second PUCCH transmissions and perform joint encoding prior to transmitting the combined transmission to a base station 105. In another example, the base station 105 may schedule a PUCCH transmission and a PUSCH transmission from the UE 115 at the same time. In this example, the UE 115 may piggyback the PUCCH transmission on the PUSCH transmission. That is, the UE 115 may encode the payloads of the PUCCH transmission and the PUSCH transmission and combine the encoded payloads prior to transmitting the combined transmission to a base station 105.

Using the above techniques, a UE 115 may combine uplink transmissions when the UE 115 is scheduled for multiple uplink transmissions on different channels at the same time. In some aspects, however, uplink transmissions associated with different applications or intended for different base stations may be scheduled at the same time, and it may not be appropriate for a UE 115 to combine the uplink transmissions. For instance, if a UE 115 is scheduled for an MBB uplink transmission and a URLLC uplink transmission at the same time, it may not be appropriate for the UE 115 to combine these transmissions (e.g., since combining these transmissions on a URLLC channel may overburden the URLLC channel). Further, if a UE 115 is scheduled for an uplink transmission to one base station 105 and another uplink transmission to another base station 105 (i.e., a multi-TRP transmission) at the same time, it may not be appropriate for the UE 115 to combine these transmissions when there is non-ideal backhaul between the base stations 105 (e.g., since the uplink transmission for one base station 105 may not be useful to the other base station 105). Wireless communications system 100 may support efficient techniques for configuring a UE 115 to determine whether to combine uplink transmissions scheduled on overlapping time resources.

Figure 2:
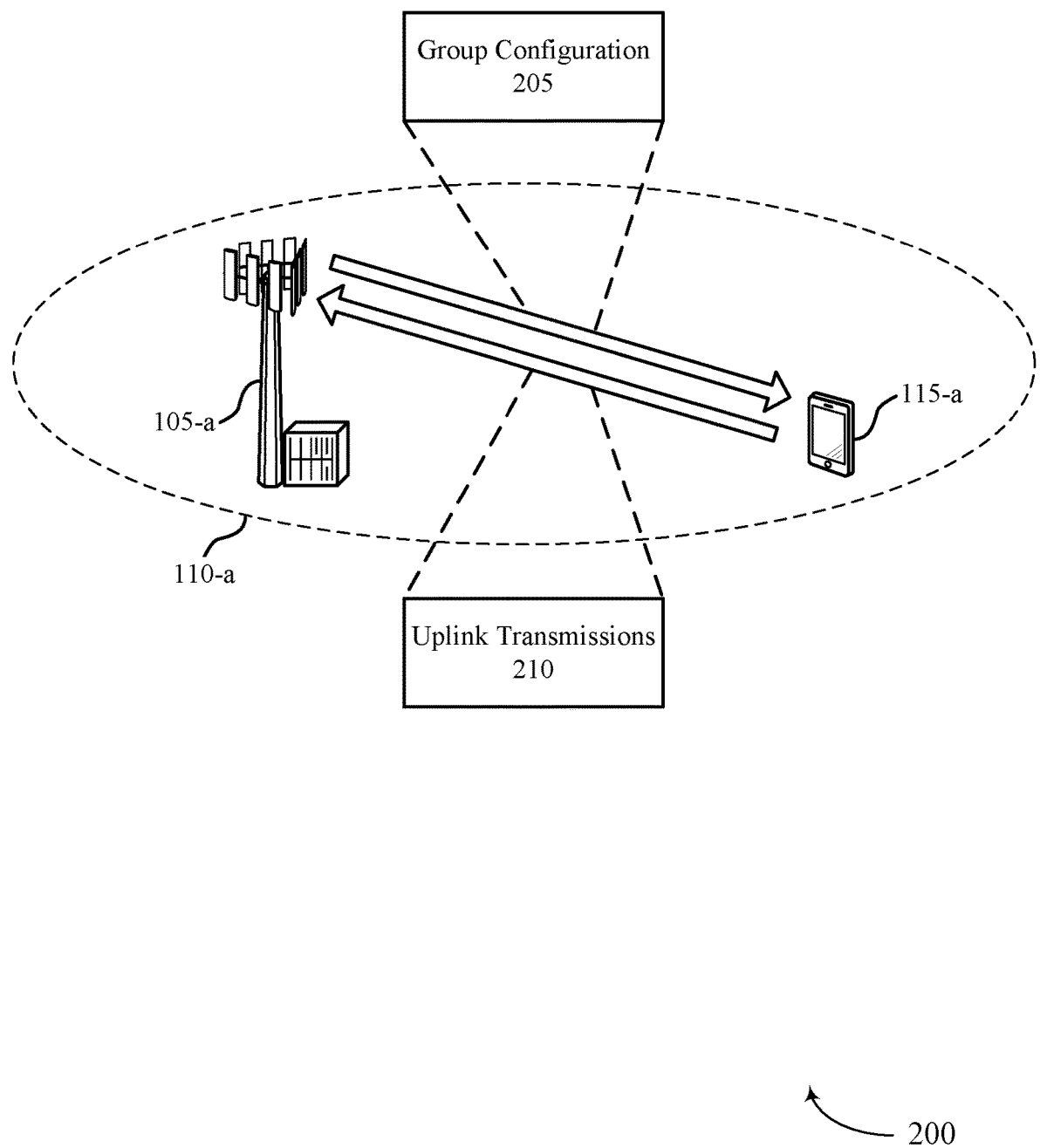

FIG. 2 illustrates an example of a wireless communications system 200 that supports uplink channel multiplexing and piggybacking in accordance with aspects of the present disclosure. Wireless communications system 200 includes base station 105-a, which may be an example of a base station 105 described with reference to FIG. 1. Wireless communications system 200 also includes UE 115-a, which may be an example of a UE 115 described with reference to FIG. 1. Base station 105-a may provide communication coverage for a respective coverage area 110-a, which may be an example of a coverage area 110 described with reference to FIG. 1. Wireless communications system 200 may implement aspects of wireless communications system 100. For example, wireless communications system 200 may support efficient techniques for configuring UE 115-a to determine whether to combine uplink transmissions 210 scheduled on overlapping time resources.

In the example of FIG. 2, base station 105-a may transmit a group configuration 205 to UE 115-a. The group configuration 205 may indicate that uplink channels used for uplink transmissions 210 from the UE 115-a are associated with uplink group indices. The group configuration 205 may also indicate a number of group indices configured for each of a number of channels (e.g., PUCCH, PUSCH, etc.) or may indicate whether one or multiple group indices are configured for each of a number of channels (e.g., where a group index may be enabled based on the number of group indices configured for a channel or the number of group indices configured for all channels). In some cases, a different number of groups and group indices may be configured for different types of uplink channels (e.g., PUCCH, PUSCH, etc.).

UE 115-a may receive the group configuration 205 and may use the techniques described herein to determine whether to combine uplink transmissions 210. For instance, if the UE 115-a is scheduled for an MBB uplink transmission and a URLLC uplink transmission at the same time, it may not be appropriate for the UE 115-a to combine these transmissions (e.g., since combining these transmissions on a URLLC channel may overburden the URLLC channel). Further, if the UE 115-a is scheduled for an uplink transmission to one base station and another uplink transmission to another base station (i.e., a multi-TRP transmission) at the same time, it may not be appropriate for the UE 115-a to combine these transmissions when there is non-ideal backhaul between the base stations (e.g., since the uplink transmission for one base station may not be useful to the other base station).

Before UE 115-a may determine whether to combine uplink transmissions 210 or a portion of uplink transmissions 210, however, it may be appropriate for UE 115-a to determine a group index corresponding to each of the uplink transmissions 210. UE 115-a may determine the group index corresponding to each of the uplink transmissions 210 using the techniques described below.

For a control information transmission (e.g., a PUCCH transmission), the corresponding group index may be implicitly indicated by base station 105-a. In particular, base station 105-a may allocate a control resource (e.g., a PUCCH resource) for the control information transmission, and UE 115-a may determine the group index for the control information transmission based on the control resource. That is, UE 115-a may be configured with a list of group indices corresponding to different control resources, and UE 115-a may determine the group index for the control information transmission based on the group index corresponding to the allocated control resource.

Similarly, for an SRS transmission, the corresponding group index may be implicitly indicated by base station 105-a. In particular, base station 105-a may allocate an SRS resource in an SRS resource set for the SRS transmission, and UE 115-a may determine the group index for the SRS transmission based on the SRS resource or the SRS resource set. That is, UE 115-a may be configured with a list of group indices corresponding to different SRS resources or different SRS resource sets, and UE 115-a may determine the group index for the SRS transmission based on the group index corresponding to the allocated SRS resource or the SRS resource set that includes the allocated SRS resource.

For a channel state information (CSI) report transmission, the corresponding group index may be implicitly or explicitly indicated by base station 105-a. In one example, base station 105-a may indicate (e.g., in a CSI report configuration) whether the CSI report transmission is for periodic, semi-persistent, or aperiodic CSI reporting, and UE 115-a may determine the group index for the CSI report transmission based on whether the CSI report transmission is for periodic, semi-persistent, or aperiodic CSI reporting. That is, UE 115-a may be configured with a list of group indices corresponding to periodic, semi-persistent, and aperiodic CSI reporting, and UE 115-a may determine the group index for the CSI report transmission based on a first group index for periodic CSI reporting if the CSI report transmission is for periodic CSI reporting, a second group index for semi-persistent CSI reporting if the CSI report transmission is for semi-persistent CSI reporting, or a third group index for aperiodic CSI reporting if the CSI report transmission is for aperiodic CSI reporting. In another example, for a CSI report transmission on a control channel, base station 105-a may allocate a control resource for the CSI report transmission, and UE 115-a may determine the group index for the CSI report transmission based on the control resource (as described above). In yet another example, for a CSI report transmission on a data channel, base station 105-a may indicate the group index for the CSI report transmission in a dedicated configuration parameter of a control message (e.g., in a CSI report configuration message) transmitted to UE 115-a.

For a scheduling request (SR) transmission, the corresponding group index may be indicated by base station 105-a. In particular, base station 105-a may transmit an indication of an SR configuration for the SR transmission, and UE 115-a may determine the group index for the SR transmission based on the SR configuration. That is, UE 115-a may be configured with a list of group indices corresponding to different SR configurations, and UE 115-a may determine the group index for the SR transmission based on the group index corresponding to the SR configuration for the SR transmission. In another example, base station 105-*a* may allocate a control resource for the SR transmission, and UE 115-*a* may determine the group index for the SR transmission based on the control resource (as described above).

For a data transmission, the corresponding group index may be explicitly or implicitly indicated by base station 105-*a*. In one example, base station 105-*a* may transmit an indication of a default group index for data transmissions on a data channel, and UE 115-*a* may use the default group index as the group index for the data transmission if no other group index is indicated. Default group indices may be configured on a per carrier or per uplink bandwidth part (BWP) basis (i.e., a default group index may be configured for each carrier or uplink BWP used for communication between UE 115-*a* and base station 105-*a*). Thus, the indication of the default group index from the base station 105-*a* may be for a particular carrier or bandwidth part. In another example, base station 105-*a* may transmit DCI to UE 115-*a* to schedule the data transmission (e.g., for dynamically scheduled PUSCH transmissions) or activate the data transmission (e.g., for type 2 PUSCH with a configured grant), where the DCI may indicate an SRS resource for an SRS transmission from UE 115-*a* (e.g., an SRS resource index to be used for the PUSCH transmission). And UE 115-*a* may determine the group index for the data transmission based on a group index corresponding to the SRS resource for the SRS transmission (e.g., in accordance with the techniques described above for determining the group index for SRS transmissions). If an SRS resource index field is missing in the DCI, UE 115-*a* may use the default group index as the group index for the data transmission.

In yet another example, base station 105-*a* may transmit DCI to UE 115-*a* to schedule or activate the data transmission, and UE 115-*a* may determine the group index for the data transmission based on an indication of the group index in the DCI. In some cases, the group index for the data transmission may be indicated in a dedicated group index field in the DCI, and, in other cases, the group index for the data transmission may be indicated by physical layer parameters configured for the data transmission (e.g., the group index may be indicated by the radio network temporary identifier (RNTI) that scrambles the cyclic redundancy check (CRC) bits of the DCI). In yet another example, base station 105-*a* may transmit higher layer signaling (e.g., RRC signaling including a configured grant) that indicates the group index for the data transmission (e.g., for a PUSCH transmission with configured grant type 1). In this example, data transmissions (e.g., PUSCH transmissions) associated with the same configured grant may have the same group index.

Once UE 115-*a* identifies the group indices of the uplink transmissions 210 using any of the techniques described above, UE 115-*a* may compare the group indices of the uplink transmissions to determine whether to combine the uplink transmissions 210 or combine a portion of the uplink transmissions 210 (i.e., using multiplexing or piggybacking). Further, if the uplink transmissions 210 include at least two sets of uplink transmissions with different indices, UE 115-*a* may determine which of the sets of uplink transmissions to transmit to base station 105-*a* based on priority rules, and UE 115-*a* may combine the uplink transmissions within the set with the highest priority for transmission to base station 105-*a*.

If UE 115-*a* determines that a first uplink transmission is associated with a same group index as a second uplink transmission, and UE 115-*a* determines to piggyback the first uplink transmission (e.g., a PUCCH transmission) on the second uplink transmission (e.g., a PUSCH transmission), UE 115-*a* may identify parameters for piggybacking based on the same group index (i.e., the group index of the first and second uplink transmissions). In one example, UE 115-*a* may determine a beta-offset value based on the group index of the first and second uplink transmissions, and UE 115-*a* may determine a coding rate for encoding the first uplink transmission based on the beta-offset and based on a coding rate for encoding the second uplink transmission. In particular, if the coding rate for encoding the second uplink transmission is R1, UE 115-*a* may determine the coding rate for encoding the first uplink transmission to be R1 divided by the beta-offset (i.e., R1/beta-offset).

In another example, UE 115-*a* may determine a scaling factor (e.g., a value between 0 and 1) based on the group index of the first and second uplink transmissions, and UE 115-*a* may use the scaling factor to determine a first number of resource elements to use for the first uplink transmission and a second number of resource elements to use for the second uplink transmission. In particular, UE 115-*a* may identify a total number of resource elements allocated for the second uplink transmission (e.g., based on a resource allocation received from base station 105-*a*), and UE 115-*a* may determine the first number of resource elements to use for the first uplink transmission and the second number of resource elements to use for the second uplink transmission based on applying the scaling factor to the total number of resource elements. The scaling factor may indicate the maximum portion of the total number of resource elements that is available for the first uplink transmission and may limit the number of resource elements used for the first uplink transmission.

Figure 3:
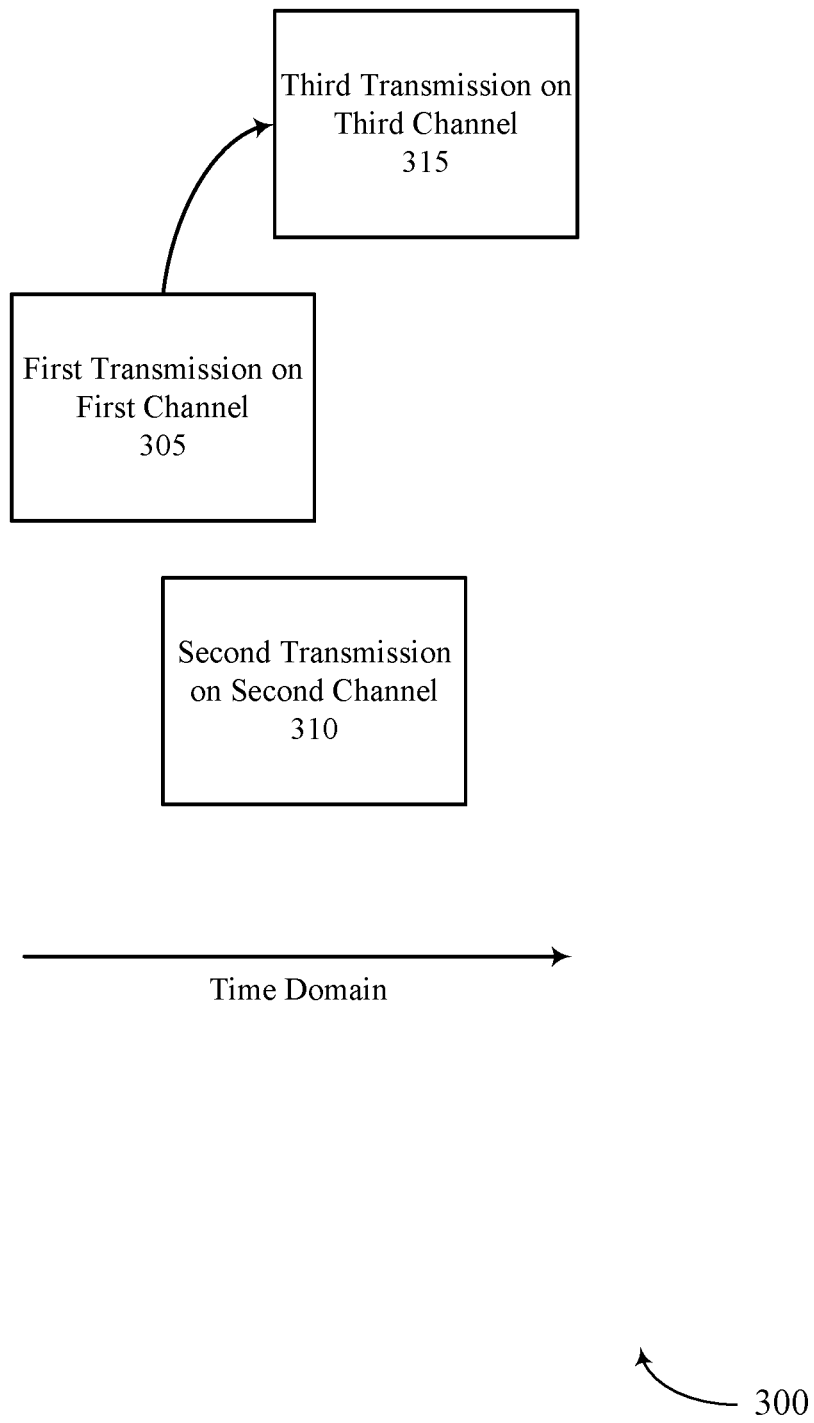
FIG. 3 illustrates an example of combining uplink transmissions scheduled at the same time in different channels in accordance with aspects of the present disclosure.

FIG. 3 illustrates an example of combining uplink transmissions scheduled at the same time in different channels 300 in accordance with aspects of the present disclosure. In the example of FIG. 3, UE 115-*a* may be scheduled to transmit a first transmission 305 on a first channel, a second transmission 310 on a second channel, and a third transmission 315 on a third channel. As illustrated, the first, second, and third transmissions may overlap in a time domain. Accordingly, UE 115-*a* may determine the group index of each of the first, second, and third transmissions, and UE 115-*a* may determine whether to combine these transmissions in a single channel to base station 105-*a*. For instance, if UE 115-*a* is scheduled for an MBB uplink transmission as the second transmission and URLLC uplink transmissions as the first and third transmissions at the same time, it may not be appropriate for the UE 115-*a* to combine these transmissions (e.g., since combining these transmissions on a URLLC channel may overburden the URLLC channel). Further, if the UE 115-*a* is scheduled for an uplink transmission to one base station as the second transmission and uplink transmissions to another base station as the first and third transmissions (i.e., a multi-TRP transmission) at the same time, it may not be appropriate for the UE 115-*a* to combine these transmissions when there is non-ideal backhaul between the base stations (e.g., since the uplink transmission for one base station may not be useful to the other base station).

In some cases, UE 115-*a* may determine that the first transmission 305 has a same group index as the third transmission 315, and UE 115-*a* may also determine that the group index of the first transmission 305 and the third transmission 315 is associated with a higher priority than the group index of the second transmission 310 (e.g., based on comparing the priorities of the group indices). Accordingly, UE 115-a may combine the first transmission 305 and the third transmission 315 in a single channel for transmission to base station 105-a, and UE 115-a may drop the second transmission 310 or drop the portion of the second transmission 310 that collides with the first and third transmissions (not shown). Alternatively, if UE 115-a is capable of transmitting multiple uplink transmissions associated with different group indices in multiple channels simultaneously, UE 115-a may combine the first transmission 305 and the third transmission 315 in a single channel, as discussed above, and then transmit the first and third uplink transmissions in the single channel and simultaneously transmit the second uplink transmission in a separate channel to base station 105-a. In one example, UE 115-a may determine the priority associated with a group index based on the group index (e.g., with lower group indices being associated with higher priorities), and, in another example, UE 115-a may receive an indication from base station 105-a of the priorities associated with different group indices.

In some aspects, if the first transmission 305 is a CSI report transmission, and the third transmission 315 is a HARQ or SR transmission, UE 115-a may determine whether to combine the CSI report transmission and the HARQ or SR transmission based on the group index corresponding to CSI report transmission and the HARQ or SR transmission. For instance, UE 115-a may be allowed to combine the CSI report transmission and the HARQ or SR transmission for a first group index, and UE 115-a may not be allowed to combine the CSI report transmission and the HARQ or SR transmission for a second group index. Base station 105-a may configure (e.g., semi-statically configure) the group indices for which UE 115-a may be allowed to combine CSI report transmissions and HARQ or SR transmissions (e.g., via a parameter in an RRC message). If a CSI report transmission and HARQ or SR transmission is not allowed to be combined for a particular group index, and a CSI report transmission collides with a HARQ or SR transmission with the corresponding group index, UE 115-a may drop the CSI report transmission and transmit the HARQ or SR.

Figure 4:
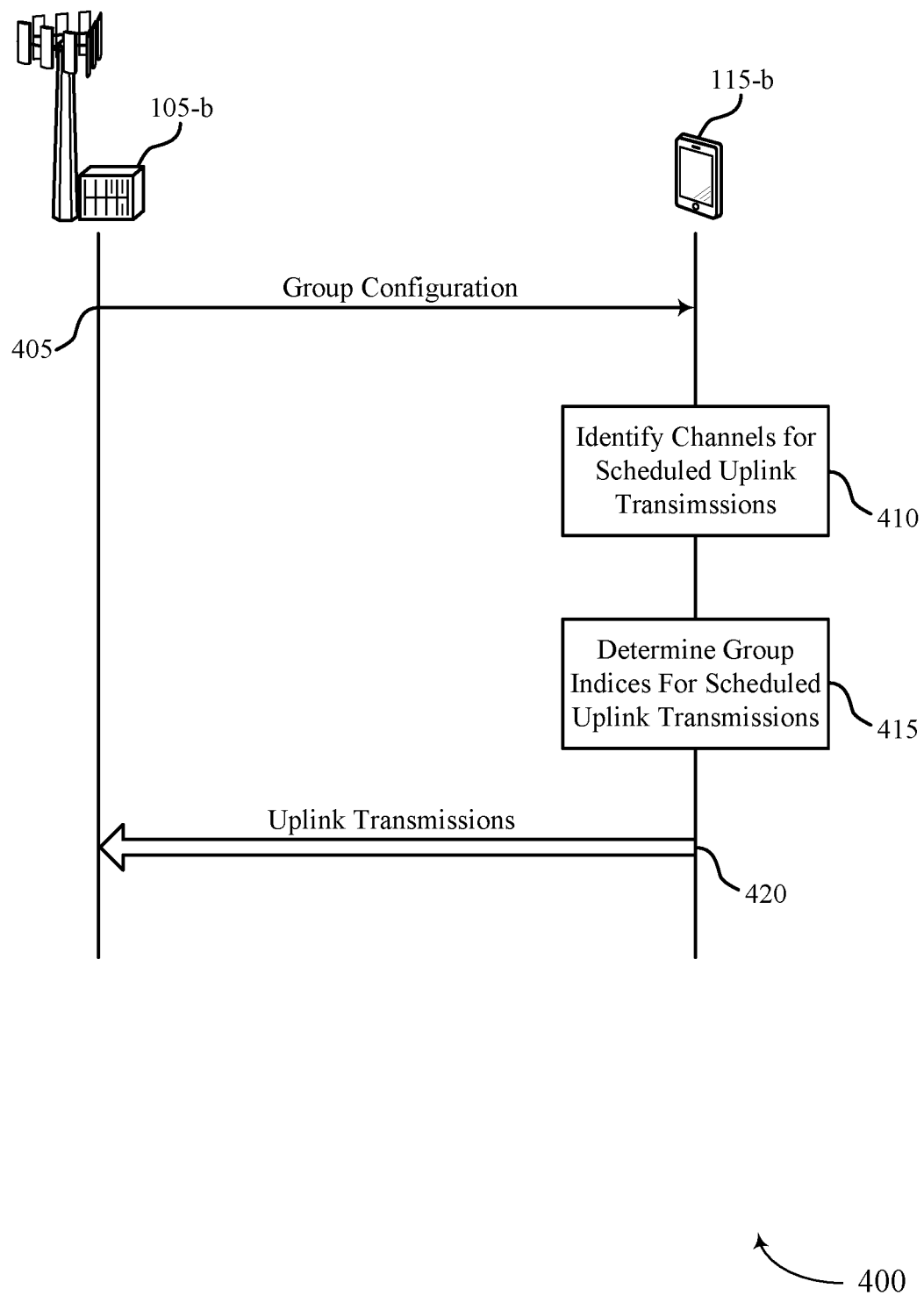
FIG. 4 illustrates an example of a process flow that supports uplink channel multiplexing and piggybacking in accordance with aspects of the present disclosure.

FIG. 4 illustrates an example of a process flow 400 that supports uplink channel multiplexing and piggybacking in accordance with aspects of the present disclosure. Process flow 400 illustrates aspects of techniques performed by a base station 105-b, which may be an example of a base station 105 described with reference to FIGS. 1-3. Process flow 400 also illustrates aspects of techniques performed by a UE 115-b, which may be an example of a UE 115 described with reference to FIGS. 1-3. The techniques described herein allow UE 115-b to efficiently combine uplink transmissions in a single channel to base station 105-b based on group indices associated with the uplink transmissions. In some cases, combining uplink transmissions may also be described as combining uplink channels, where the uplink channels used for uplink transmissions may be associated with group indices. In such cases, an uplink channel of a particular type (e.g., PUSCH) may be associated with multiple group indices (e.g., a first group index for a first PUSCH used for a first uplink transmission and a second group index for a second PUSCH used for a second uplink transmission), and one type of uplink channel may be combined with a same type of uplink channel or a different type of uplink channel (e.g., PUCCH).

At 405, base station 105-b may transmit a group configuration to UE 115-b that indicates an association of uplink channels with group indices, where uplink channels having a same group index are to be combined with each other according to the group configuration and uplink channels having different group indices are not combined. In some cases, the group configuration may be a group index configuration or a configuration of indices indicating groups of channels that may be combined (e.g., via multiplexing or piggybacking), and the group configuration may be referred to as a multiplexing group configuration or a multiplexing group index configuration. At 410, UE 115-b may identify uplink channels for uplink transmissions to base station 105-b. At 415, UE 115-a may then determine the group indices for the uplink transmissions. In particular, UE 115-a may determine the group indices for each of the uplink transmissions using the techniques described with reference to FIG. 2 depending on whether an uplink transmission is a control information transmission, data transmission, SRS transmission, CSI report transmission, SR transmission, etc. At 420, UE 115-b may then transmit at least a portion of the plurality of uplink transmissions on a single uplink channel based on the group indices.

In some cases, UE 115-a may determine that two or more of the uplink transmissions have a same group index. Accordingly, UE 115-b may combine the two or more uplink transmissions, and UE 115-b may transmit the combined uplink transmission to base station 105-b in a single uplink channel. In one example, combining the two or more uplink transmissions includes multiplexing a first uplink transmission with a second uplink transmission in the single channel. In another example, combining the two or more uplink transmissions includes piggybacking a first uplink transmissions on a second uplink transmission in the single channel. In other cases, UE 115-b may determine that a first uplink transmission and a second uplink transmission have a same group index, and UE 115-b may determine that the first uplink transmission is a CSI report transmission and the second uplink transmission is a HARQ or SR transmission. Accordingly, UE 115-b may determine whether to combine the CSI report transmission with the HARQ or SR transmission based on the group index corresponding to the CSI report transmission and the HARQ or SR transmission.

In yet other cases, UE 115-b may determine that a first group index corresponding to a first uplink transmission is different from a second group index corresponding to a second uplink transmission. Accordingly, UE 115-b may compare a first priority associated with the first group index with a second priority associated with the second group index, and UE 115-b may determine whether to transmit the first uplink transmission or the second uplink transmission based on the comparison. In some cases, UE 115-b may receive an indication of the first priority associated with the first group index and the second priority associated with the second group index from base station 105-b. In other cases, UE 115-b may determine the first priority associated with the first group index based on the first group index, and UE 115-b may determine the second priority associated with the second group index based on the second group index.

In some aspects, if UE 115-b is capable of transmitting multiple uplink transmissions on different channels simultaneously and UE 115-b determines that a first group index corresponding to a first uplink transmission is different from a second group index corresponding to a second uplink transmission, UE 115-b may transmit the first uplink transmission on a first channel and a second uplink transmission on a second channel. That is, UE 115-b may transmit uplink transmissions associated with different group indices simultaneously without combining these transmissions.

Figure 5:
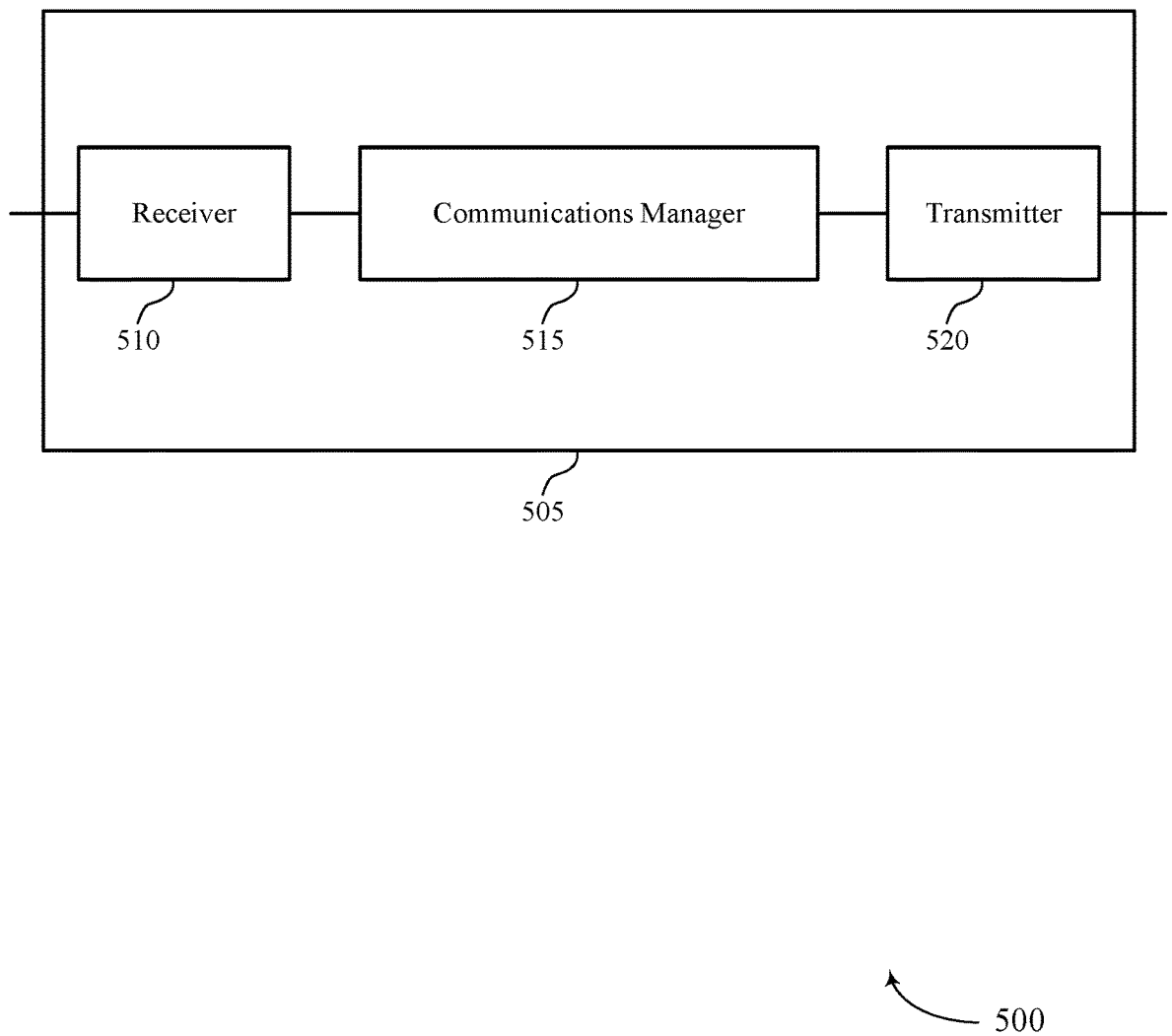
FIGS. 5 and 6 show block diagrams of devices that support uplink channel multiplexing and piggybacking in accordance with aspects of the present disclosure.

FIG. 5 shows a block diagram 500 of a device 505 that supports uplink channel multiplexing and piggybacking in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to uplink channel multiplexing and piggybacking, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive a group configuration that indicates an association of uplink channels with group indices, where uplink channels having a same group index are to be combined with each other according to the group configuration and uplink channels having different group indices are not combined, identify a set of uplink channels to be used for a corresponding set of uplink transmissions which overlap in time, determine individual group indices of the group configuration corresponding to each of the set of uplink channels, and transmit at least a portion of the set of uplink transmissions on a single uplink channel based on the individual group indices of the group configuration. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
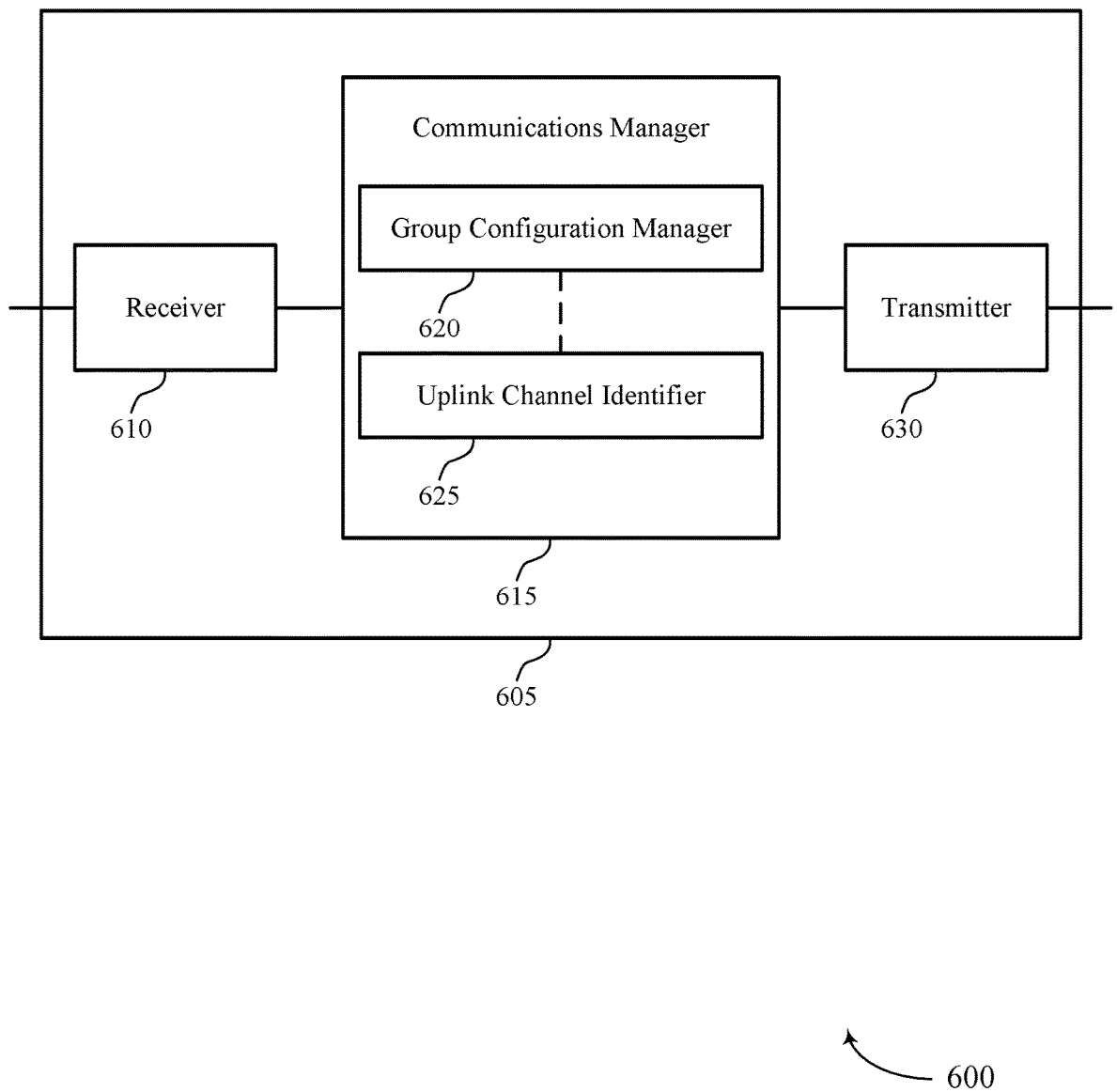

FIG. 6 shows a block diagram 600 of a device 605 that supports uplink channel multiplexing and piggybacking in accordance with aspects of the present disclosure. The device 605 may be an example of aspects of a device 505, or a UE 115 as described herein. The device 605 may include a receiver 610, a communications manager 615, and a transmitter 630. The device 605 may also include a processor. Each of these components may be in communication with one another (e.g., via one or more buses).

The receiver 610 may receive information such as packets, user data, or control information associated with various information channels (e.g., control channels, data channels, and information related to uplink channel multiplexing and piggybacking, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a group configuration manager 620 and an uplink channel identifier 625. The communications manager 615 may be an example of aspects of the communications manager 810 described herein.

The group configuration manager 620 may receive a group configuration that indicates an association of uplink channels with group indices, where uplink channels having a same group index are to be combined with each other according to the group configuration and uplink channels having different group indices are not combined. The uplink channel identifier 625 may identify a set of uplink channels to be used for a corresponding set of uplink transmissions which overlap in time. The group configuration manager 620 may then determine individual group indices of the group configuration corresponding to each of the set of uplink channels, and the transmitter 630 may transmit at least a portion of the set of uplink transmissions on a single uplink channel based on the individual group indices of the group configuration.

The transmitter 630 may transmit signals generated by other components of the device 605. In some examples, the transmitter 630 may be collocated with a receiver 610 in a transceiver module. For example, the transmitter 630 may be an example of aspects of the transceiver 820 described with reference to FIG. 8. The transmitter 630 may utilize a single antenna or a set of antennas.

Figure 7:
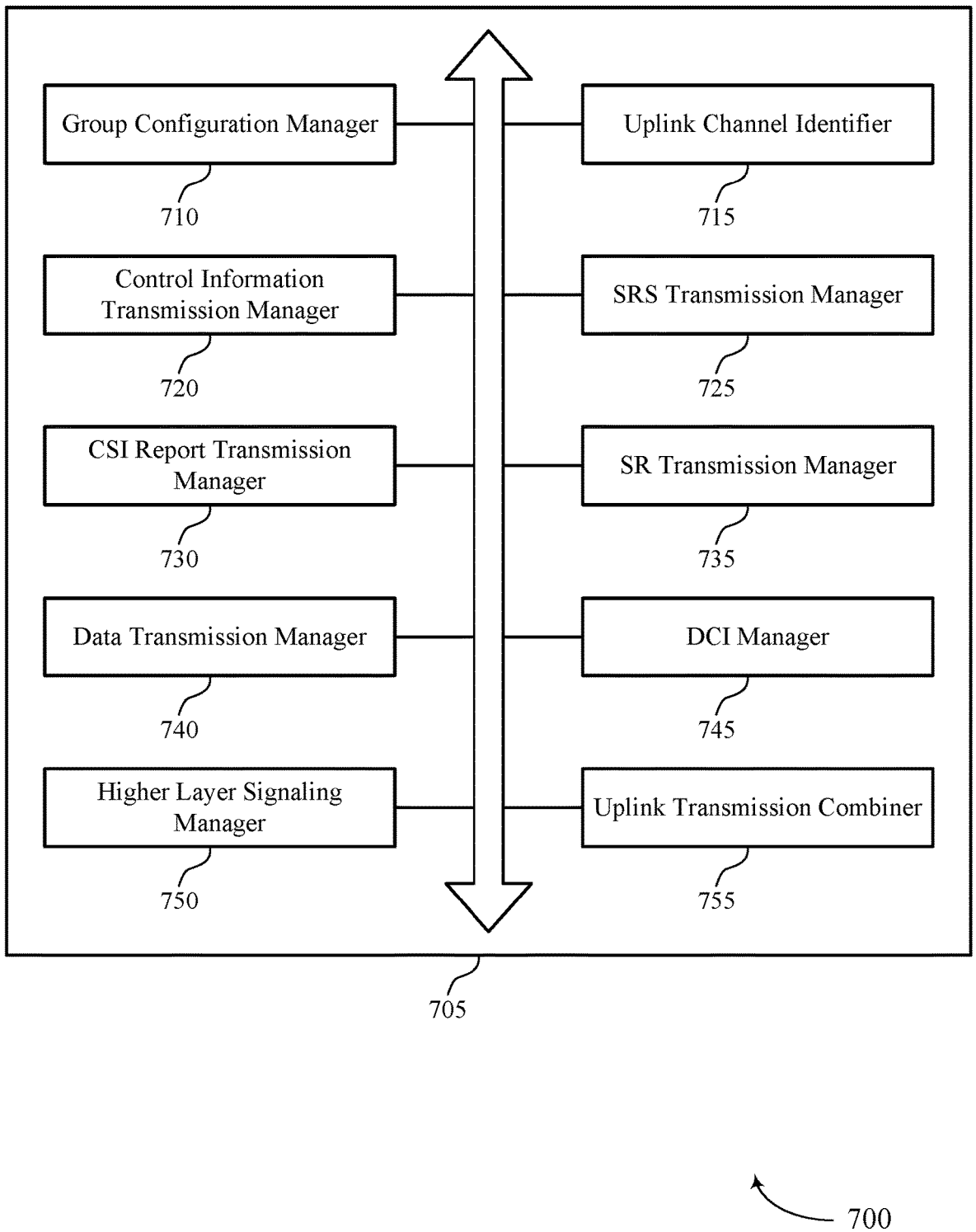
FIG. 7 shows a block diagram of a communications manager that supports uplink channel multiplexing and piggybacking in accordance with aspects of the present disclosure.

FIG. 7 shows a block diagram 700 of a communications manager 705 that supports uplink channel multiplexing and piggybacking in accordance with aspects of the present disclosure. The communications manager 705 may be an example of aspects of a communications manager 515, a communications manager 615, or a communications manager 810 described herein. The communications manager 705 may include a group configuration manager 710, an uplink channel identifier 715, a control information transmission manager 720, a SRS transmission manager 725, a CSI report transmission manager 730, a SR transmission manager 735, a data transmission manager 740, a DCI manager 745, a higher layer signaling manager 750, and an uplink transmission combiner 755. Each of these modules may communicate, directly or indirectly, with one another (e.g., via one or more buses).

The group configuration manager 710 may receive a group configuration that indicates an association of uplink channels with group indices, where uplink channels having a same group index are to be combined with each other according to the group configuration and uplink channels having different group indices are not combined. In some examples, the group configuration manager 710 may determine individual group indices of the group configuration corresponding to each of the set of uplink channels. In some examples, the group configuration manager 710 may determine a group index corresponding to the control information transmission based on the control channel resource. In some examples, the group configuration manager 710 may determine a group index corresponding to the SRS transmission based on the SRS resource.

In some examples, the group configuration manager 710 may determine a group index corresponding to the CSI report transmission based on whether the CSI report transmission is associated with periodic, semi-persistent, or aperiodic CSI reporting, where periodic, semi-persistent, and aperiodic CSI report transmissions are associated with different group indices. In some examples, the group configuration manager 710 may determine a group index corresponding to the CSI report transmission based on the control channel resource. In some examples, the group configuration manager 710 may determine a group index corresponding to the CSI report transmission based on an indication of the group index in the CSI report configuration.

In some examples, the group configuration manager 710 may determine a group index corresponding to the SR transmission based on the SR configuration, where the SR configuration is associated with the group index. In some examples, the group configuration manager 710 may determine a group index for the data transmission on the data channel based on a default group index corresponding to data transmissions on the data channel. In some examples, the default group index is a first default group index corresponding to data transmissions on the data channel on a first carrier or first BWP, and the first default group index is different from a second default group index corresponding to data transmissions on the data channel on a second carrier or second BWP. In some examples, the group configuration manager 710 may determine a group index for the data transmission based on the group index for the SRS transmission. In some examples, the group configuration manager 710 may determine a group index for the data transmission based on a default group index corresponding to data transmissions on the data channel.

In some examples, the group configuration manager 710 may determine the group index for the data transmission based on an indication of the group index for the data transmission in the DCI. In some examples, the group configuration manager 710 may determine a group index for the data transmission based on an indication of the group index in the higher layer signaling. In some examples, the group configuration manager 710 may determine that two or more of the set of uplink transmissions have a same group index. In some examples, the group configuration manager 710 may determine that a first uplink transmission and a second uplink transmission of the set of uplink transmissions have a same group index.

In some examples, the group configuration manager 710 may receive an indication of a priority associated with each of the individual group indices. In some examples, the group configuration manager 710 may receive an indication of a first priority associated with a first group index and a second priority associated with a second group index. In some examples, the group configuration manager 710 may determine a first priority associated with a first group index based on the first group index. In some examples, the group configuration manager 710 may determine a second priority associated with a second group index based on the second group index.

In some examples, the group configuration manager 710 may determine that a first group index corresponding to a first uplink transmission of the set of uplink transmissions is different from a second group index corresponding to a second uplink transmission of the set of uplink transmissions. In some examples, the group configuration manager 710 may compare a first priority associated with the first group index with a second priority associated with the second group index. In some examples, the group configuration manager 710 may determine that a first group index corresponding to a first uplink transmission of the set of uplink transmissions is different from a second group index corresponding to a second uplink transmission of the set of uplink transmissions.

In some cases, the group index for the data transmission is indicated in a dedicated field in the DCI. In some cases, the group index for the data transmission is indicated by physical layer parameters configured for the data transmission in the DCI. In some cases, the group configuration further indicates a total number of group indices configured for each of the set of channels. The uplink channel identifier 715 may identify a set of uplink channels to be used for a corresponding set of uplink transmissions which overlap in time.

The control information transmission manager 720 may identify that one of the set of uplink transmissions is a control information transmission on a control channel. In some examples, the control information transmission manager 720 may identify a control channel resource allocated for the control information transmission on the control channel. In some examples, the control information transmission manager 720 may receive an indication of the control channel resource, where the control channel resource is associated with the group index. In some examples, determining that the first uplink transmission includes a CSI report transmission and the second uplink transmission includes a HARQ transmission or a scheduling request (SR) transmission.

The SRS transmission manager 725 may identify that one of the set of uplink transmissions is a SRS transmission on an SRS channel. In some examples, the SRS transmission manager 725 may identify an SRS resource allocated for the SRS transmission on the SRS channel. In some examples, the SRS transmission manager 725 may receive an indication of the SRS resource, where the SRS resource is associated with the group index or the SRS resource is within an SRS resource set associated with the group index. The CSI report transmission manager 730 may identify that one of the set of uplink transmissions is a CSI report transmission. In some examples, the CSI report transmission manager 730 may determine whether the CSI report transmission is associated with periodic, semi-persistent, or aperiodic CSI reporting.

In some examples, the CSI report transmission manager 730 may identify that one of the set of uplink transmissions is a CSI report transmission on a control channel. In some examples, the CSI report transmission manager 730 may identify a control channel resource allocated for the CSI report transmission on the control channel. In some examples, the CSI report transmission manager 730 may identify that one of the set of uplink transmissions is a CSI report transmission on a data channel. In some examples, the CSI report transmission manager 730 may receive a CSI report configuration for the CSI report transmission.

The SR transmission manager 735 may identify that one of the set of uplink transmissions is a scheduling request (SR) transmission. In some examples, the SR transmission manager 735 may identify an SR configuration for the SR transmission. The data transmission manager 740 may identify that one of the set of uplink transmissions is a data transmission on a data channel. The DCI manager 745 may receive DCI scheduling or activating the data transmission. In some examples, the DCI manager 745 may identify a SRS resource indicated by the DCI for an SRS transmission, the SRS resource associated with a group index for the SRS transmission.

In some examples, the DCI manager 745 may fail to identify a SRS resource configured by the DCI for an SRS transmission. In some examples, the DCI manager 745 may receive DCI scheduling or activating the data transmission. The higher layer signaling manager 750 may receive higher layer signaling that schedules the data transmission. The uplink transmission combiner 755 may combine the two or more of the set of uplink transmissions to generate an uplink transmission based on the group indices of the two or more of the set of uplink transmissions being the same.

In some examples, the uplink transmission combiner 755 may multiplex a first uplink transmission of the two or more of the set of uplink transmissions with a second uplink transmission of the two or more of the set of uplink transmissions in the single uplink channel. In some examples, the uplink transmission combiner 755 may piggyback a first uplink transmission of the two or more of the set of uplink transmissions on a second uplink transmission of the two or more of the set of uplink transmissions in the single uplink channel. In some examples, the uplink transmission combiner 755 may determine whether to combine the CSI report transmission with the HARQ or SR transmission based on the same group index.

In some examples, piggybacking the first uplink transmission on the second uplink transmission includes determining a first coding rate for encoding the first uplink transmission based on a beta offset and a second coding rate for encoding the second uplink transmission, where the beta offset corresponds to the same group index of the first uplink transmission and the second uplink transmission; and encoding the first uplink transmission based at least in part on the first coding rate and the second uplink transmission based at least in part on the second coding rate. In some examples, piggybacking the first uplink transmission on the second uplink transmission includes identifying a set of resources allocated for the second uplink transmission; identifying a first subset of the set of resources to use for the first uplink transmission and a second subset of the set of resources to use for the second uplink transmission based at least in part on a scaling factor, where the scaling factor indicates a maximum portion of the set of resources available for the first uplink transmission, and the scaling factor corresponds to the same group index of the first uplink transmission and the second uplink transmission; and mapping the first uplink transmission to the first subset of the set of resources and the second uplink transmission to the second subset of the set of resources.

In some examples, the communications manager 705 may transmit at least a portion of the set of uplink transmissions on a single uplink channel based on the individual group indices of the group configuration. In some examples, the communications manager 705 may transmit the combined uplink transmission including of the two or more of the set of uplink transmissions on the single uplink channel. In some examples, the communications manager 705 may determine whether to transmit the first uplink transmission or the second uplink transmission based on the comparison. In some examples, the communications manager 705 may transmit the first uplink transmission on a first channel and the second uplink transmission on a second channel.

Figure 8:
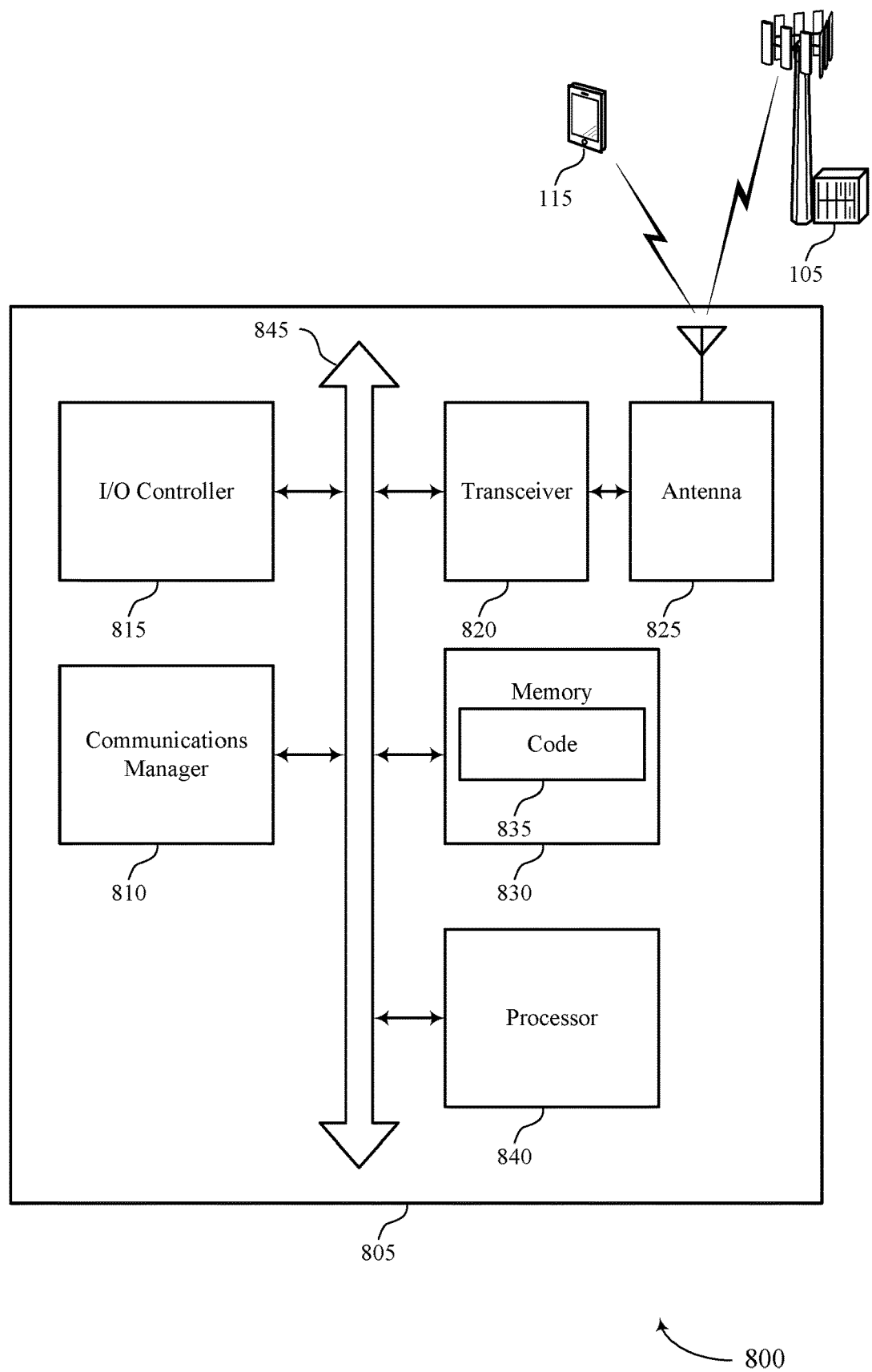
FIG. 8 shows a diagram of a system including a device that supports uplink channel multiplexing and piggybacking in accordance with aspects of the present disclosure.

FIG. 8 shows a diagram of a system 800 including a device 805 that supports uplink channel multiplexing and piggybacking in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive a group configuration that indicates an association of uplink channels with group indices, where uplink channels having a same group index are to be combined with each other according to the group configuration and uplink channels having different group indices are not combined, identify a set of uplink channels to be used for a corresponding set of uplink transmissions which overlap in time, determine individual group indices of the group configuration corresponding to each of the set of uplink channels, and transmit at least a portion of the set of uplink transmissions on a single uplink channel based on the individual group indices of the group configuration.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting uplink channel multiplexing and piggybacking).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
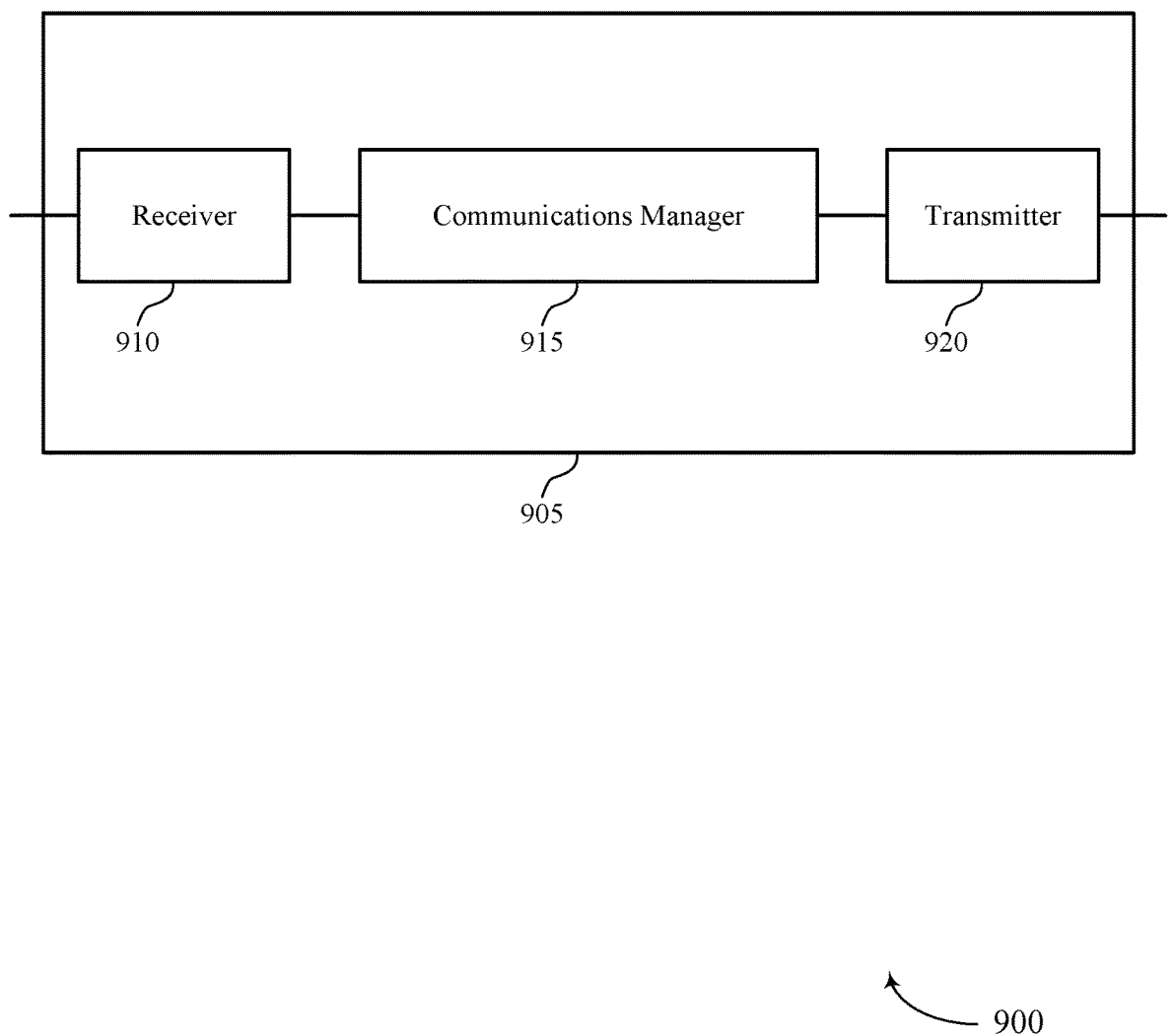
FIGS. 9 and 10 show block diagrams of devices that support uplink channel multiplexing and piggybacking in accordance with aspects of the present disclosure.

FIG. 9 shows a block diagram 900 of a device 905 that supports uplink channel multiplexing and piggybacking in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to uplink channel multiplexing and piggybacking, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may transmit a group configuration that indicates an association of uplink channels with group indices, where uplink channels having a same group index are to be combined with each other according to the group configuration and uplink channels having different group indices are not combined, configure a group index for the uplink transmission on the uplink channel, where the group index is to be used by the UE to determine whether to combine the uplink transmission with another uplink transmission scheduled on overlapping time resources, identify an uplink channel to be used for an uplink transmission from a UE, and monitor for the uplink transmission from the UE based on the configuring. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
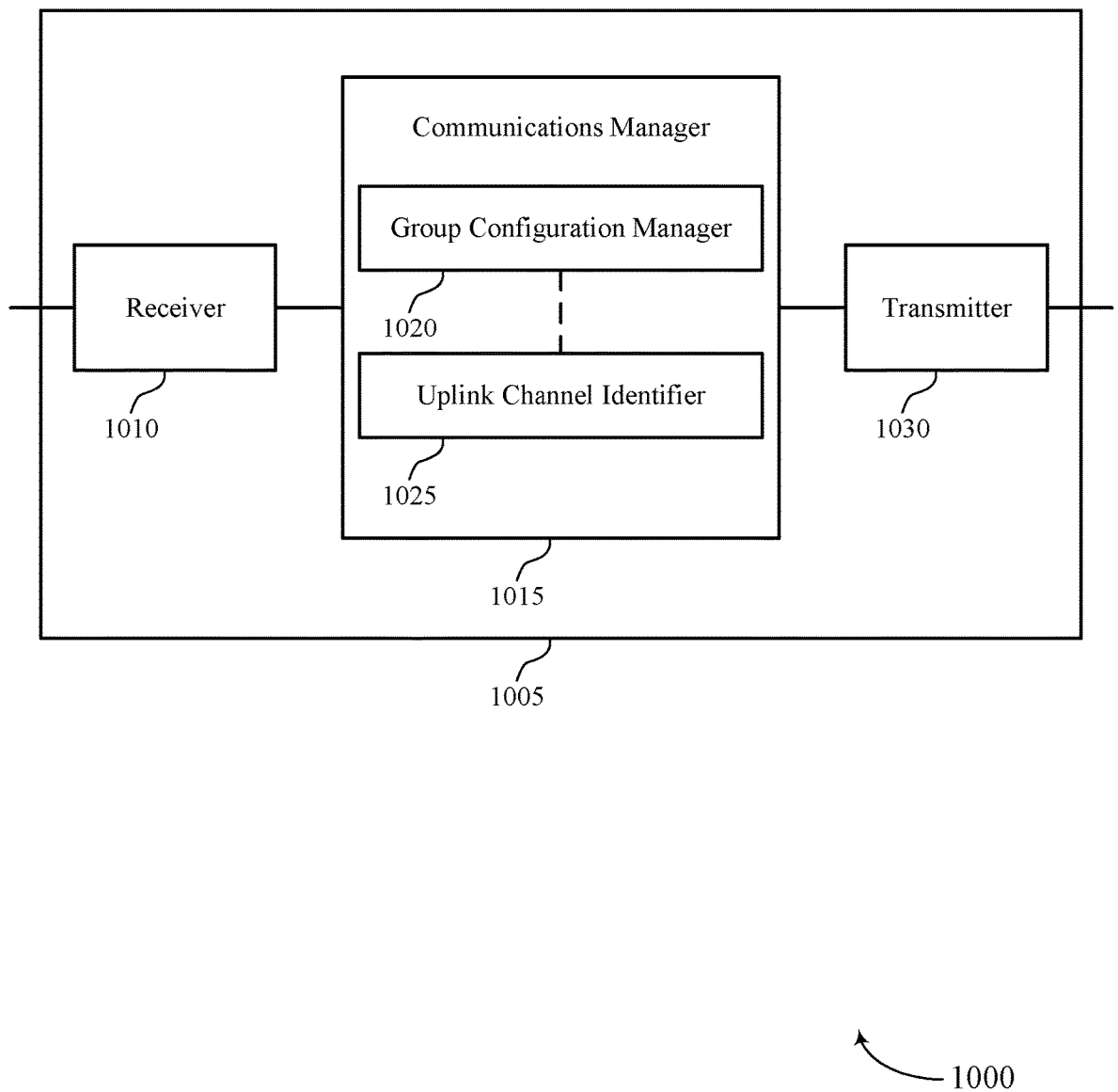

FIG. 10 shows a block diagram 1000 of a device 1005 that supports uplink channel multiplexing and piggybacking in accordance with aspects of the present disclosure. The device 1005 may be an example of aspects of a device 905, or a base station 105 as described herein. The device 1005 may include a receiver 1010, a communications manager 1015, and a transmitter 1030. The device 1005 may also include a processor. Each of these components may be in communication with one another (e.g., via one or more buses).

The receiver 1010 may receive information such as packets, user data, or control information associated with various information channels (e.g., control channels, data channels, and information related to uplink channel multiplexing and piggybacking, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a group configuration manager 1020 and an uplink channel identifier 1025. The communications manager 1015 may be an example of aspects of the communications manager 1210 described herein.

The group configuration manager 1020 may transmit a group configuration that indicates an association of uplink channels with group indices, where uplink channels having a same group index are to be combined with each other according to the group configuration and uplink channels having different group indices are not combined. The uplink channel identifier 1025 may identify an uplink channel to be used for an uplink transmission from a UE. The group configuration manager 1020 may then configure a group index for the uplink transmission on the uplink channel, where the group index is to be used by the UE to determine whether to combine the uplink transmission with another uplink transmission scheduled on overlapping time resources, and receiver 1010 may monitor for the uplink transmission from the UE based on the configuring.

The transmitter 1030 may transmit signals generated by other components of the device 1005. In some examples, the transmitter 1030 may be collocated with a receiver 1010 in a transceiver module. For example, the transmitter 1030 may be an example of aspects of the transceiver 1220 described with reference to FIG. 12. The transmitter 1030 may utilize a single antenna or a set of antennas.

Figure 11:
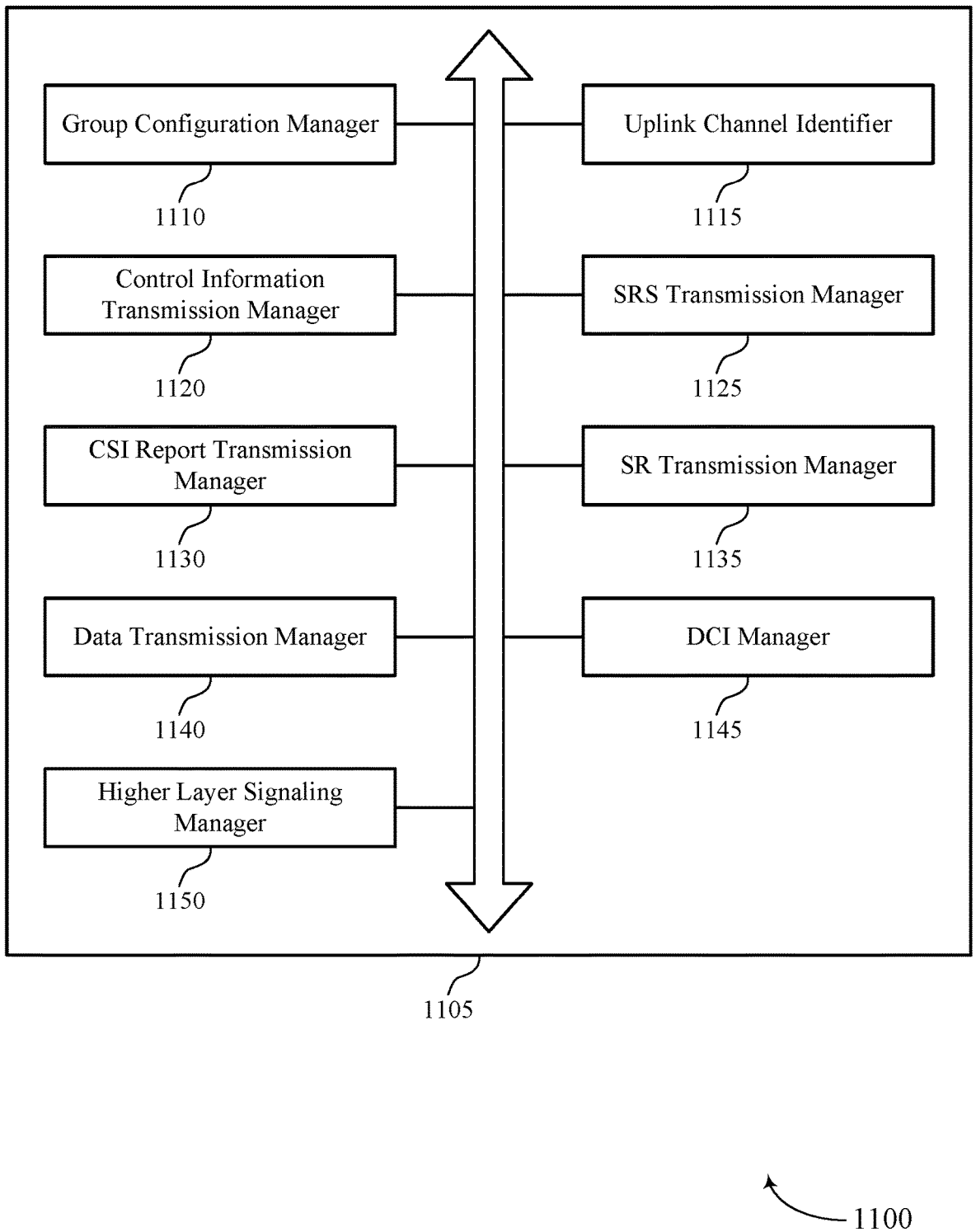
FIG. 11 shows a block diagram of a communications manager that supports uplink channel multiplexing and piggybacking in accordance with aspects of the present disclosure.

FIG. 11 shows a block diagram 1100 of a communications manager 1105 that supports uplink channel multiplexing and piggybacking in accordance with aspects of the present disclosure. The communications manager 1105 may be an example of aspects of a communications manager 915, a communications manager 1015, or a communications manager 1210 described herein. The communications manager 1105 may include a group configuration manager 1110, an uplink channel identifier 1115, a control information transmission manager 1120, a SRS transmission manager 1125, a CSI report transmission manager 1130, a SR transmission manager 1135, a data transmission manager 1140, a DCI manager 1145, and a higher layer signaling manager 1150. Each of these modules may communicate, directly or indirectly, with one another (e.g., via one or more buses).

The group configuration manager 1110 may transmit a group configuration that indicates an association of uplink channels with group indices, where uplink channels having a same group index are to be combined with each other according to the group configuration and uplink channels having different group indices are not combined. In some examples, the group configuration manager 1110 may configure a group index for the uplink transmission on the uplink channel, where the group index is to be used by the UE to determine whether to combine the uplink transmission with another uplink transmission scheduled on overlapping time resources. In some examples, the group configuration manager 1110 may transmit an indication of a priority associated with the group index corresponding to the uplink transmission on the uplink channel.

The uplink channel identifier 1115 may identify an uplink channel to be used for an uplink transmission from a UE. The control information transmission manager 1120 may identify that the uplink transmission includes a control information transmission on a control channel. In some examples, the control information transmission manager 1120 may transmit an indication of a control channel resource for the control information transmission on the control channel, where the group index for the control information transmission corresponds to a group index associated with the control channel resource. The SRS transmission manager 1125 may identify that the uplink transmission includes a SRS transmission on an SRS channel. In some examples, the SRS transmission manager 1125 may transmit an indication of an SRS resource for the SRS transmission, where the group index for the SRS transmission corresponds to a group index associated with the SRS resource or associated with an SRS resource set that includes the SRS resource.

The CSI report transmission manager 1130 may identify that the uplink transmission includes a CSI report transmission. In some examples, the CSI report transmission manager 1130 may transmit an indication of whether the CSI report transmission is associated with periodic, semi-persistent, or aperiodic CSI reporting, where periodic, semi-persistent, and aperiodic CSI report transmissions are associated with different group indices. In some examples, identifying that the uplink transmission includes a CSI report transmission on a control channel.

In some examples, the CSI report transmission manager 1130 may transmit an indication of a control channel resource for the CSI report transmission on the control channel, where the group index for the CSI report transmission corresponds to a group index associated with the control channel resource. In some examples, identifying that the uplink transmission includes a CSI report transmission on a data channel. In some examples, the CSI report transmission manager 1130 may transmit a CSI report configuration for the CSI report transmission, where the CSI report configuration includes an indication of the group index for the CSI report transmission on the data channel.

The SR transmission manager 1135 may identify that the uplink transmission includes a scheduling request (SR) transmission. In some examples, the SR transmission manager 1135 may transmit an indication of an SR configuration for the SR transmission, where the group index for the SR transmission corresponds to a group index associated with the SR configuration. The data transmission manager 1140 may identify that the uplink transmission includes a data transmission on a data channel. In some examples, the data transmission manager 1140 may transmit an indication of a default group index for data transmissions on the data channel, where the group index for the data transmission is the default group index. In some examples, the default group index is a first default group index corresponding to data transmissions on the data channel on a first carrier or first BWP, and the first default group index is different from a second default group index corresponding to data transmissions on the data channel on a second carrier or second BWP.

The DCI manager 1145 may transmit DCI to the UE for the data transmission, the DCI including an indication of a SRS resource allocated for SRS transmissions from the UE, where the SRS resource is associated with a group index for the SRS transmission, and the group index for the data transmission corresponds to the group index for the SRS transmission. In some examples, the DCI manager 1145 may transmit DCI to the UE for the data transmission, the DCI including an indication of the group index for the data transmission. In some cases, the group index for the data transmission is indicated in a dedicated field in the DCI. In some cases, the group index for the data transmission is indicated by physical layer parameters configured for the data transmission in the DCI. The higher layer signaling manager 1150 may transmit higher layer signaling that schedules the data transmission, where the higher layer signaling includes an indication of the group index for the data transmission. In some examples, the communications manager 1105 may monitor for the uplink transmission from the UE based on the configuring.

Figure 12:
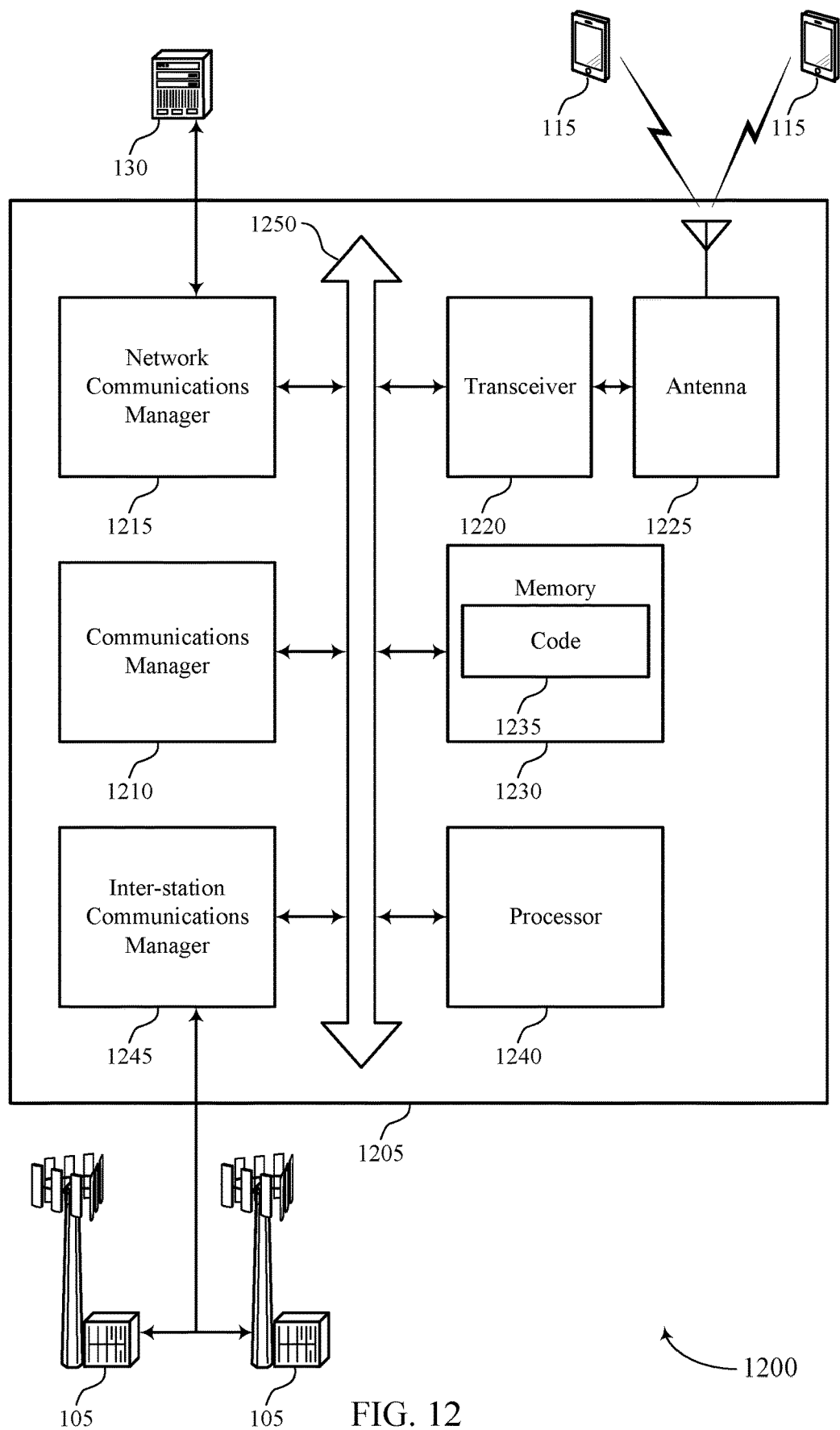
FIG. 12 shows a diagram of a system including a device that supports uplink channel multiplexing and piggybacking in accordance with aspects of the present disclosure.

FIG. 12 shows a diagram of a system 1200 including a device 1205 that supports uplink channel multiplexing and piggybacking in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may transmit a group configuration that indicates an association of uplink channels with group indices, where uplink channels having a same group index are to be combined with each other according to the group configuration and uplink channels having different group indices are not combined, configure a group index for the uplink transmission on the uplink channel, where the group index is to be used by the UE to determine whether to combine the uplink transmission with another uplink transmission scheduled on overlapping time resources, identify an uplink channel to be used for an uplink transmission from a UE, and monitor for the uplink transmission from the UE based on the configuring.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting uplink channel multiplexing and piggybacking).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
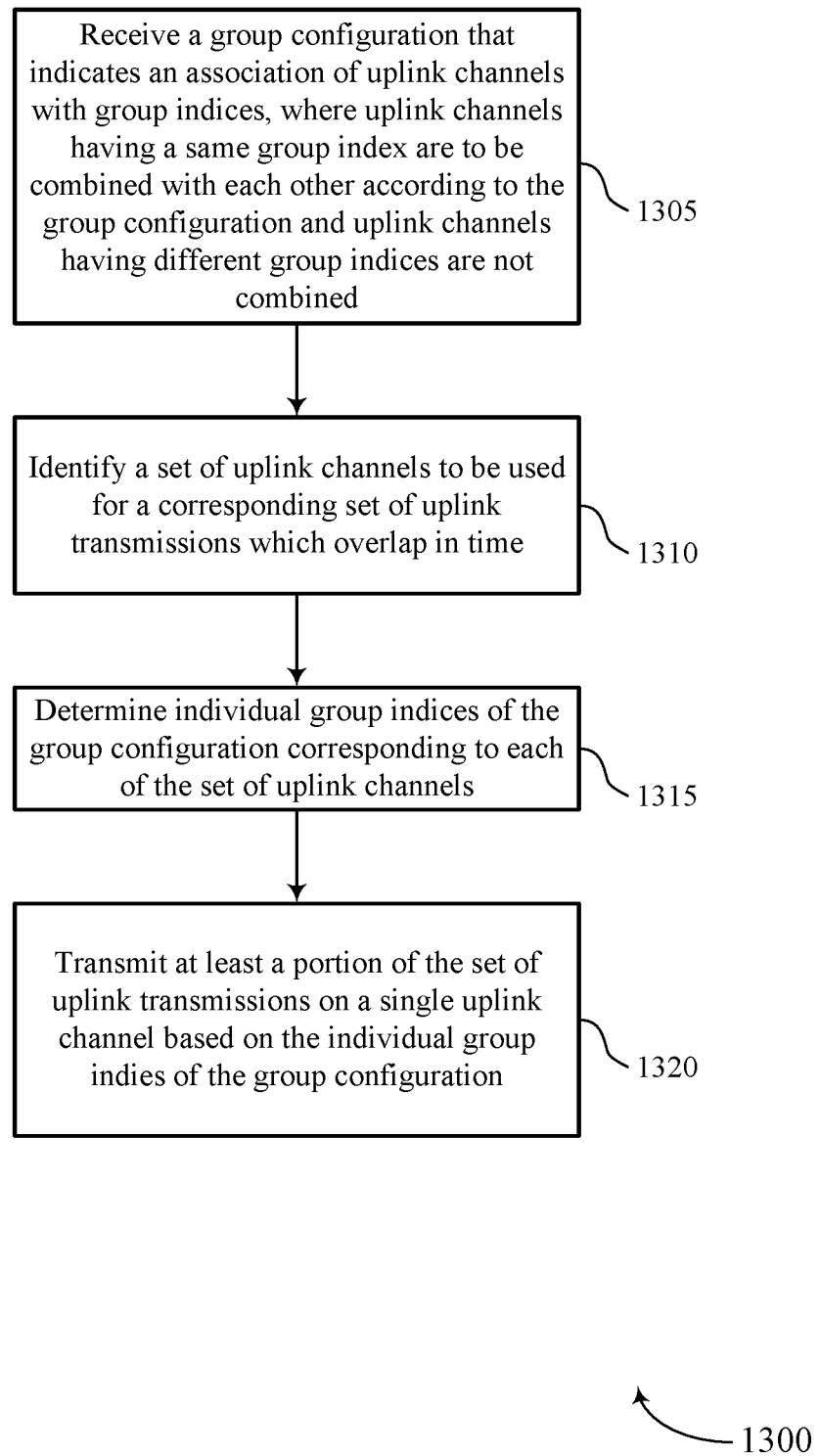
FIGS. 13 and 14 show flowcharts illustrating methods that support uplink channel multiplexing and piggybacking in accordance with aspects of the present disclosure.

FIG. 13 shows a flowchart illustrating a method 1300 that supports uplink channel multiplexing and piggybacking in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive a group configuration that indicates an association of uplink channels with group indices, where uplink channels having a same group index are to be combined with each other according to the group configuration and uplink channels having different group indices are not combined. The operations of 1305 may be performed according to the methods described herein. In some examples, aspects of the operations of 1305 may be performed by a group configuration manager as described with reference to FIGS. 5 through 8.

At 1310, the UE may identify a set of uplink channels to be used for a corresponding set of uplink transmissions which overlap in time. The operations of 1310 may be performed according to the methods described herein. In some examples, aspects of the operations of 1310 may be performed by an uplink channel identifier as described with reference to FIGS. 5 through 8.

At 1315, the UE may determine individual group indices of the group configuration corresponding to each of the set of uplink channels. The operations of 1315 may be performed according to the methods described herein. In some examples, aspects of the operations of 1315 may be performed by a group configuration manager as described with reference to FIGS. 5 through 8.

At 1320, the UE may transmit at least a portion of the set of uplink transmissions on a single uplink channel based on the individual group indices of the group configuration. The operations of 1320 may be performed according to the methods described herein. In some examples, aspects of the operations of 1320 may be performed by an uplink channel identifier as described with reference to FIGS. 5 through 8.

Figure 14:
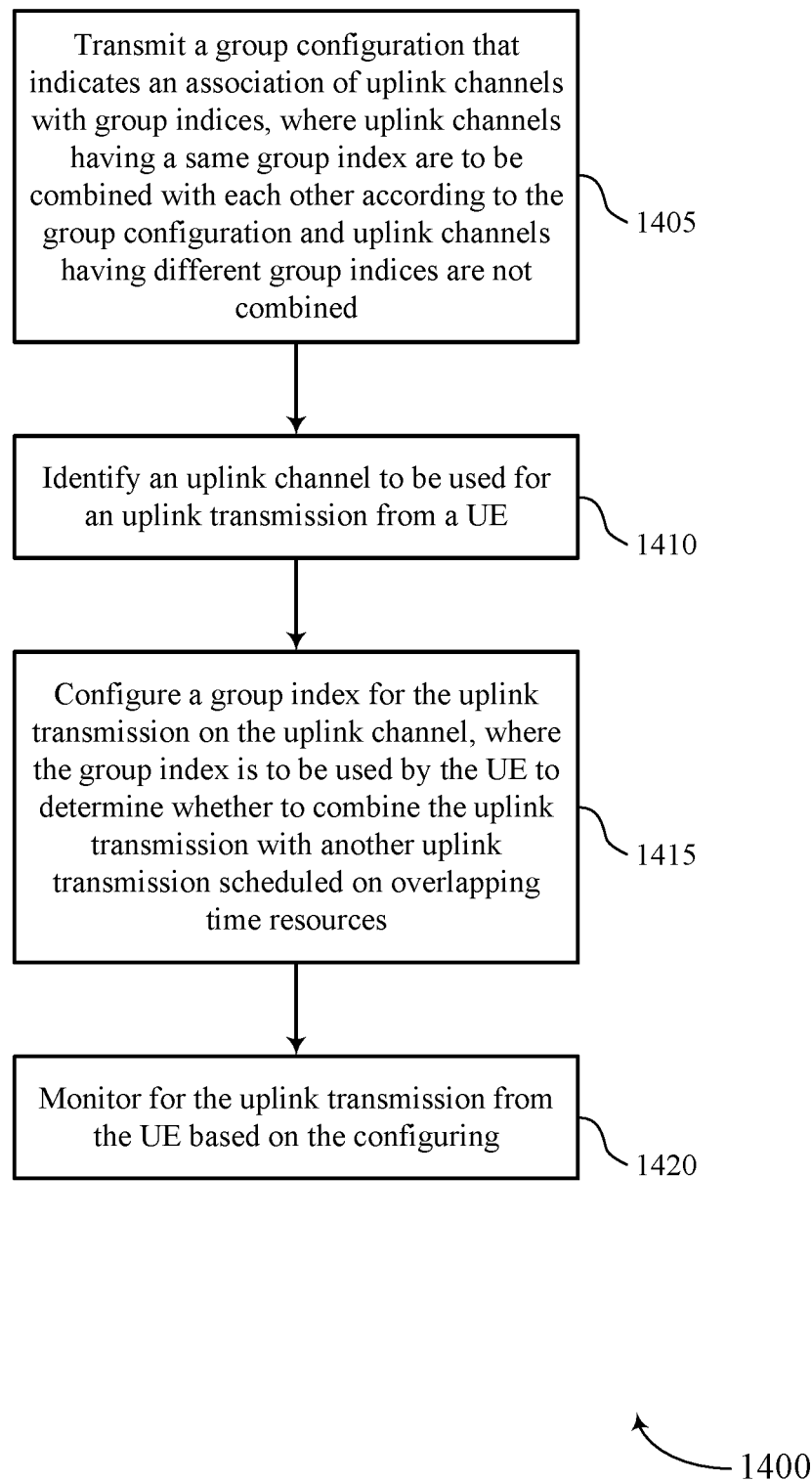

FIG. 14 shows a flowchart illustrating a method 1400 that supports uplink channel multiplexing and piggybacking in accordance with aspects of the present disclosure. The operations of method 1400 may be implemented by a base station 105 or its components as described herein. For example, the operations of method 1400 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1405, the base station may transmit a group configuration that indicates an association of uplink channels with group indices, where uplink channels having a same group index are to be combined with each other according to the group configuration and uplink channels having different group indices are not combined. The operations of 1405 may be performed according to the methods described herein. In some examples, aspects of the operations of 1405 may be performed by a group configuration manager as described with reference to FIGS. 9 through 12.

At 1410, the base station may identify an uplink channel to be used for an uplink transmission from a UE. The operations of 1410 may be performed according to the methods described herein. In some examples, aspects of the operations of 1410 may be performed by an uplink channel identifier as described with reference to FIGS. 9 through 12.

At 1415, the base station may configure a group index for the uplink transmission on the uplink channel, where the group index is to be used by the UE to determine whether to combine the uplink transmission with another uplink transmission scheduled on overlapping time resources. The operations of 1415 may be performed according to the methods described herein. In some examples, aspects of the operations of 1415 may be performed by a group configuration manager as described with reference to FIGS. 9 through 12.

At 1420, the base station may monitor for the uplink transmission from the UE based on the configuring. The operations of 1420 may be performed according to the methods described herein. In some examples, aspects of the operations of 1420 may be performed by an uplink channel identifier as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UNITS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving a group configuration that indicates an association of uplink channels with group indices;
   identifying a plurality of uplink channels to be used for a plurality of uplink transmissions which overlap in time;
   determining individual group indices of the group configuration corresponding to each of the plurality of uplink channels; and
   transmitting at least a portion of the plurality of uplink transmissions via a single uplink channel based at least in part on the individual group indices of the group configuration.

2. The method of claim 1, wherein first uplink channels having a same group index are to be combined with each other according to the group configuration and second uplink channels having different group indices are not to be combined.

3. The method of claim 1, further comprising:
   canceling at least a second portion of the plurality of uplink transmissions based at least in part on the individual group indices of the group configuration.

4. The method of claim 1, wherein the group indices comprise priority indices.

5. The method of claim 1, further comprising:
   identifying that one of the plurality of uplink transmissions is a control information transmission via a control channel;
   identifying a control channel resource allocated for the control information transmission via the control channel; and
   determining a group index corresponding to the control information transmission based at least in part on the control channel resource.

6. The method of claim 5, wherein identifying the control channel resource comprises:
   receiving an indication of the control channel resource, wherein the control channel resource is associated with the group index.

7. The method of claim 5, wherein identifying the control channel resource comprises:
   receiving a configuration of the group index for each control channel resource.

8. The method of claim 1, further comprising:
   identifying that one of the plurality of uplink transmissions is a sounding reference signal (SRS) transmission via an SRS channel;
   identifying an SRS resource allocated for the SRS transmission via the SRS channel; and
   determining a group index corresponding to the SRS transmission based at least in part on the SRS resource.

9. The method of claim 8, wherein identifying the SRS resource comprises:
   receiving an indication of the SRS resource, wherein the SRS resource is associated with the group index or the SRS resource is within an SRS resource set associated with the group index.

10. The method of claim 1, further comprising:
    identifying that one of the plurality of uplink transmissions is a channel state information (CSI) report transmission;

determining whether the CSI report transmission is associated with periodic, semi-persistent, or aperiodic CSI reporting; and
determining a group index corresponding to the CSI report transmission based at least in part on whether the CSI report transmission is associated with the periodic, semi-persistent, or aperiodic CSI reporting, wherein periodic, semi-persistent, and aperiodic CSI report transmissions are associated with different group indices.

11. The method of claim 1, further comprising:
identifying that one of the plurality of uplink transmissions is a channel state information (CSI) report transmission via a control channel;
identifying a control channel resource allocated for the CSI report transmission via the control channel; and
determining a group index corresponding to the CSI report transmission based at least in part on the control channel resource.

12. The method of claim 1, further comprising:
identifying that one of the plurality of uplink transmissions is a channel state information (CSI) report transmission via a data channel;
receiving a CSI report configuration for the CSI report transmission; and
determining a group index corresponding to the CSI report transmission based at least in part on an indication of the group index in the CSI report configuration.

13. The method of claim 1, further comprising:
identifying that one of the plurality of uplink transmissions is a scheduling request (SR) transmission;
identifying an SR configuration for the SR transmission; and
determining a group index corresponding to the SR transmission based at least in part on the SR configuration, wherein the SR configuration is associated with the group index.

14. The method of claim 1, further comprising:
identifying that one of the plurality of uplink transmissions is a data transmission via a data channel; and
determining a group index for the data transmission via the data channel based at least in part on a default group index corresponding to data transmissions via the data channel.

15. The method of claim 1, further comprising:
identifying that one of the plurality of uplink transmissions is a data transmission via a data channel;
receiving downlink control information (DCI) scheduling or activating the data transmission;
identifying a sounding reference signal (SRS) resource indicated by the DCI for an SRS transmission, the SRS resource associated with a group index for the SRS transmission; and
determining a group index for the data transmission based at least in part on the group index for the SRS transmission.

16. The method of claim 1, further comprising:
identifying that one of the plurality of uplink transmissions is a data transmission via a data channel;
receiving downlink control information (DCI) scheduling or activating the data transmission;
identifying that the DCI does not contain a sounding reference signal (SRS) resource index field; and
determining a group index for the data transmission based at least in part on a default group index corresponding to data transmissions via the data channel.

17. The method of claim 1, further comprising:
identifying that one of the plurality of uplink transmissions is a data transmission via a data channel;
receiving downlink control information (DCI) scheduling or activating the data transmission; and
determining a group index for the data transmission based at least in part on an indication of the group index for the data transmission in the DCI.

18. The method of claim 17, wherein the group index for the data transmission is indicated in a group indication field in the DCI.

19. The method of claim 17, wherein the group index for the data transmission is indicated by physical layer parameters configured for the data transmission in the DCI.

20. The method of claim 1, further comprising:
identifying that one of the plurality of uplink transmissions is a data transmission via a data channel;
receiving higher layer signaling that schedules the data transmission; and
determining a group index for the data transmission based at least in part on an indication of the group index in the higher layer signaling.

21. The method of claim 1, wherein the group configuration further indicates a total quantity of group indices configured for each of the plurality of uplink channels.

22. The method of claim 1, further comprising:
determining that two or more of the plurality of uplink transmissions have a same group index;
combining the two or more of the plurality of uplink transmissions to generate a combined uplink transmission based at least in part on the group indices of the two or more of the plurality of uplink transmissions being the same; and
transmitting the combined uplink transmission via the single uplink channel.

23. The method of claim 22, wherein combining the two or more of the plurality of uplink transmissions comprises:
multiplexing a first uplink transmission of the two or more of the plurality of uplink transmissions with a second uplink transmission of the two or more of the plurality of uplink transmissions via the single uplink channel; or
piggybacking the first uplink transmission of the two or more of the plurality of uplink transmissions with the second uplink transmission of the two or more of the plurality of uplink transmissions via the single uplink channel.

24. The method of claim 23, wherein piggybacking the first uplink transmission with the second uplink transmission comprises:
determining a first coding rate for encoding the first uplink transmission based at least in part on a beta offset and a second coding rate for encoding the second uplink transmission, wherein the beta offset corresponds to the same group index of the first uplink transmission and the second uplink transmission; and
encoding the first uplink transmission based at least in part on the first coding rate and the second uplink transmission based at least in part on the second coding rate.

25. The method of claim 23, wherein piggybacking the first uplink transmission with the second uplink transmission comprises:
identifying a set of resources allocated for the second uplink transmission;
identifying a first subset of the set of resources to use for the first uplink transmission and a second subset of the set of resources to use for the second uplink transmission based at least in part on a scaling factor, wherein the scaling factor indicates a maximum portion of the set of resources available for the first uplink transmission, and the scaling factor corresponds to the same group index of the first uplink transmission and the second uplink transmission; and mapping the first uplink transmission to the first subset of the set of resources and the second uplink transmission to the second subset of the set of resources.

26. The method of claim 1, further comprising:
determining that a first uplink transmission and a second uplink transmission of the plurality of uplink transmissions have a same group index;
determining that the first uplink transmission comprises a channel state information (CSI) report transmission and the second uplink transmission comprises a hybrid automatic repeat request (HARQ) transmission or a scheduling request (SR) transmission; and
determining whether to combine the CSI report transmission with the HARQ transmission or the SR transmission based at least in part on the same group index.

27. The method of claim 1, wherein receiving the group configuration further comprises:
receiving an indication of a priority associated with each of the individual group indices.

28. The method of claim 27, wherein receiving the indication of the priority associated with each of the individual group indices comprises:
receiving an indication of a first priority associated with a first group index and a second priority associated with a second group index.

29. The method of claim 27, further comprising:
determining a first priority associated with a first group index based at least in part on the first group index; and
determining a second priority associated with a second group index based at least in part on the second group index.

30. The method of claim 1, further comprising:
determining that a first group index corresponding to a first uplink transmission of the plurality of uplink transmissions is different from a second group index corresponding to a second uplink transmission of the plurality of uplink transmissions;
comparing a first priority associated with the first group index with a second priority associated with the second group index; and
determining whether to transmit the first uplink transmission or the second uplink transmission based at least in part on the comparing.

31. The method of claim 1, further comprising:
identifying that the UE has a capability to transmit multiple uplink channels simultaneously;
determining that a first group index corresponding to a first uplink transmission of the plurality of uplink transmissions is different from a second group index corresponding to a second uplink transmission of the plurality of uplink transmissions; and
transmitting the first uplink transmission via a first channel and the second uplink transmission via a second channel.

32. The method of claim 31, wherein transmitting the first uplink transmission and the second uplink transmission comprises:
transmitting the first uplink transmission via the first channel to a first network entity according to a multiple transmit receive point deployment; and
transmitting the second uplink transmission via the second channel to a second network entity according to the multiple transmit receive point deployment.

33. The method of claim 31, wherein transmitting the first uplink transmission and the second uplink transmission comprises:
transmitting the first uplink transmission via the first channel of a first component carrier; and
transmitting the second uplink transmission via the second channel of the first component carrier.

34. The method of claim 1, wherein transmitting at least the portion of the plurality of uplink transmissions comprises:
transmitting a first of the plurality of uplink transmissions to a first network entity according to a multiple transmit receive point deployment or transmitting a second of the plurality of uplink transmissions to a second network entity according to the multiple transmit receive point deployment.

35. A method for wireless communication at a network entity, comprising:
transmitting a group configuration that indicates an association of uplink channels with group indices;
identifying an uplink channel to be used for an uplink transmission from a user equipment (UE);
configuring a group index for the uplink transmission associated with the uplink channel, wherein the group index is to be used by the UE to determine whether to combine the uplink transmission with another uplink transmission scheduled for overlapping time resources;
transmitting the configured group index; and
monitoring for the uplink transmission based at least in part on the configured group index.

36. The method of claim 35, wherein first uplink channels having a same group index are to be combined with each other according to the group configuration and second uplink channels having different group indices are not combined.

37. The method of claim 35, wherein the group indices comprise priority indices.

38. The method of claim 35, further comprising:
identifying that the uplink transmission comprises a control information transmission associated with a control channel; and
transmitting an indication of a control channel resource for the control information transmission associated with the control channel, wherein the group index for the control information transmission corresponds to a group index associated with the control channel resource.

39. The method of claim 35, further comprising:
identifying that the uplink transmission comprises a sounding reference signal (SRS) transmission associated with an SRS channel; and
transmitting an indication of an SRS resource for the SRS transmission, wherein the group index for the SRS transmission corresponds to a group index associated with the SRS resource or associated with an SRS resource set that includes the SRS resource.

40. The method of claim 35, further comprising:
identifying that the uplink transmission comprises a channel state information (CSI) report transmission; and
transmitting an indication of whether the CSI report transmission is associated with periodic, semi-persistent, or aperiodic CSI reporting, wherein periodic, semi-persistent, and aperiodic CSI report transmissions are associated with different group indices.

41. The method of claim 35, further comprising:
identifying that the uplink transmission comprises a channel state information (CSI) report transmission associated with a control channel; and
transmitting an indication of a control channel resource for the CSI report transmission associated with the control channel, wherein the group index for the CSI report transmission corresponds to a group index associated with the control channel resource.

42. The method of claim 35, further comprising:
identifying that the uplink transmission comprises a channel state information (CSI) report transmission associated with a data channel; and
transmitting a CSI report configuration for the CSI report transmission, wherein the CSI report configuration includes an indication of the group index for the CSI report transmission associated with the data channel.

43. The method of claim 35, further comprising:
identifying that the uplink transmission comprises a scheduling request (SR) transmission; and
transmitting an indication of an SR configuration for the SR transmission, wherein the group index for the SR transmission corresponds to a group index associated with the SR configuration.

44. The method of claim 35, further comprising:
identifying that the uplink transmission comprises a data transmission associated with a data channel; and
transmitting an indication of a default group index for data transmissions associated with the data channel, wherein the group index for the data transmission is the default group index.

45. The method of claim 35, further comprising:
identifying that the uplink transmission comprises a data transmission associated with a data channel; and
transmitting downlink control information (DCI) for the UE and the data transmission, the DCI including an indication of a sounding reference signal (SRS) resource allocated for SRS transmissions, wherein the SRS resource is associated with a group index for the SRS transmission, and the group index for the data transmission corresponds to the group index for the SRS transmission.

46. The method of claim 35, further comprising:
identifying that the uplink transmission comprises a data transmission associated with a data channel; and
transmitting downlink control information (DCI) for the UE and the data transmission, the DCI including an indication of the group index for the data transmission.

47. The method of claim 46, wherein the group index for the data transmission is indicated in a group indication field in the DCI.

48. The method of claim 46, wherein the group index for the data transmission is indicated by physical layer parameters associated with the DCI.

49. The method of claim 35, further comprising:
identifying that the uplink transmission comprises a data transmission associated with a data channel; and
transmitting higher layer signaling that schedules the data transmission, wherein the higher layer signaling includes an indication of the group index for the data transmission.

50. The method of claim 35, further comprising:
transmitting an indication of a priority associated with the group index corresponding to the uplink transmission associated with the uplink channel.

51. An apparatus for wireless communication at a user equipment (UE), comprising:
a processor,
memory coupled with the processor; and
instructions stored in the memory and executable by the processor to cause the apparatus to:
receive a group configuration that indicates an association of uplink channels with group indices;
identify a plurality of uplink channels to be used for a plurality of uplink transmissions which overlap in time;
determine individual group indices of the group configuration corresponding to each of the plurality of uplink channels; and
transmit at least a portion of the plurality of uplink transmissions via a single uplink channel based at least in part on the individual group indices of the group configuration.

52. An apparatus for wireless communication at a network entity, comprising:
a processor,
memory coupled with the processor; and
instructions stored in the memory and executable by the processor to cause the apparatus to:
transmit a group configuration that indicates an association of uplink channels with group indices;
identify an uplink channel to be used for an uplink transmission from a user equipment (UE);
configure a group index for the uplink transmission associated with the uplink channel, wherein the group index is to be used by the UE to determine whether to combine the uplink transmission with another uplink transmission scheduled for overlapping time resources;
transmit the configured group index; and
monitor for the uplink transmission based at least in part on the configured group index.

* * * * *